(12) United States Patent
Kazerooni

(10) Patent No.: US 7,334,776 B2
(45) Date of Patent: Feb. 26, 2008

(54) APPARATUS AND METHOD FOR VEHICLE ON-BOARD CARGO HANDLING SYSTEM

(76) Inventor: Homayoon Kazerooni, 2806 Ashby Ave., Berkeley, CA (US) 94720

( * ) Notice: Subject to any disclaimer, the term of this patent is extended or adjusted under 35 U.S.C. 154(b) by 84 days.

(21) Appl. No.: 10/885,693

(22) Filed: Jul. 8, 2004

(65) Prior Publication Data

US 2006/0151765 A1      Jul. 13, 2006

(51) Int. Cl.
*B66B 1/00* (2006.01)
*B60R 9/06* (2006.01)

(52) U.S. Cl. ............... 254/270; 254/266; 414/540; 414/466; 212/285

(58) Field of Classification Search ......... 254/270, 254/266, 264, 274, 331, 360–362; 414/540, 414/463, 462, 466, 2–5, 467; 212/285, 231, 212/180; 224/310
See application file for complete search history.

(56) References Cited

U.S. PATENT DOCUMENTS

| | | | |
|---|---|---|---|
| 2,989,288 A | 6/1961 | Smith | |
| 3,921,959 A | 11/1975 | Ulbing | |
| 3,933,388 A | 1/1976 | Conboy | |
| 3,940,110 A | 2/1976 | Motoda | |
| 4,073,395 A | 2/1978 | Clement | |
| 4,221,528 A * | 9/1980 | Gordos | 414/540 |
| 4,391,379 A | 7/1983 | Paffrath | |
| 4,557,659 A | 12/1985 | Scaglia | |
| 4,573,854 A | 3/1986 | McFarland | |
| 4,604,022 A | 8/1986 | Bourgraf | |
| 4,616,972 A | 10/1986 | McFarland | |
| 4,685,860 A | 8/1987 | McFarland | |
| 4,799,849 A | 1/1989 | Miller | |
| 4,844,421 A | 7/1989 | Kojima | |
| 4,858,981 A * | 8/1989 | Post | 296/76 |
| 4,917,360 A | 4/1990 | Kojima | |
| 4,969,793 A | 11/1990 | Pawl | |
| 5,139,156 A | 8/1992 | Nakamura | |
| 5,195,726 A | 3/1993 | Kaner | |
| 5,270,621 A | 12/1993 | Kiiski | |
| 5,350,075 A | 9/1994 | Kahlman | |
| 5,388,289 A | 2/1995 | Casperson | |
| 5,437,432 A | 8/1995 | Fujikawa | |
| 5,480,125 A | 1/1996 | Bitsch et al. | |

(Continued)

OTHER PUBLICATIONS

Kazerooni, H. "Human-Robot Interaction via the Transfer of Power and Information Signals," IEEE Transactions on Systems and Cybernetics, V20, N2, pp. 450-463, Apr. 1990.
Kazerooni, H. Mahoney, S., "Dynamics and Control of Robotic Systems Worn By Humans," ASME J. of Dynamic Systems, Measurement, and Control, V113, N3, P379-387, Sep. 1991.

(Continued)

*Primary Examiner*—Peter M. Cuomo
*Assistant Examiner*—Evan H. Langdon

(57) ABSTRACT

An apparatus for loading an object into a vehicle, the vehicle having a trunk lid, the apparatus comprising: a line; an actuator adapted for applying a tensile force to the line in response to an actuator command, and disposed and adapted for transmitting at least a portion of the tensile force to the trunk lid; an end-effector mechanically coupled to the line and adapted for transmitting the tensile force and an operator force to the object and for generating an operator force measurement; and a controller adapted for generating the actuator command from the operator force measurement.

90 Claims, 34 Drawing Sheets

U.S. PATENT DOCUMENTS

| | | |
|---|---|---|
| 5,551,308 A | 9/1996 | Arai et al. |
| 5,615,785 A * | 4/1997 | Kaner ...................... 212/180 |
| 5,632,469 A | 5/1997 | Heun et al. |
| 5,671,912 A | 9/1997 | Langford |
| 5,707,094 A | 1/1998 | Gower |
| 5,765,987 A | 6/1998 | Zimmerrma |
| 5,850,928 A | 12/1998 | Kahlman et al. |
| 5,865,426 A | 2/1999 | Kazerooni |
| 5,915,673 A | 6/1999 | Kazerooni |
| 6,138,991 A | 10/2000 | Myers, Jr. |
| 6,152,675 A | 11/2000 | Compton |
| 6,299,139 B1 | 10/2001 | Kazerooni |
| 6,386,513 B1 | 5/2002 | Kazerooni |
| 6,554,252 B2 | 4/2003 | Kazerooni |
| 6,622,990 B2 | 9/2003 | Kazerooni |

OTHER PUBLICATIONS

Kazerooni, H., "The Human Power Amplifier Technology at the University of California, Berkeley", J. of Robotics and Autonomous Systems, Elsevier, V19, pp. 179-187, 1996.

Kazerooni, H., and Guo, J., "Human Extenders," ASME Journal of Dynamic Systems, Measurement, and Control, V115, N2(B), pp. 281-289, Jun. 1993.

Kazerooni, H., Her, M. G., "The Dynamics and Control of a Haptic Interface Device," IEEE Trans. on Robotics and Automation, V10, N4, pp. 453-464, Aug. 1994.

Kazerooni, H., Snyder, T. J. "A Case Study on Dynamics of Haptic Devices: Human Induced Instability" AIAA J. of Guidance, Control, and Dynamics, V18, N1, pp. 108-113, 1995.

* cited by examiner

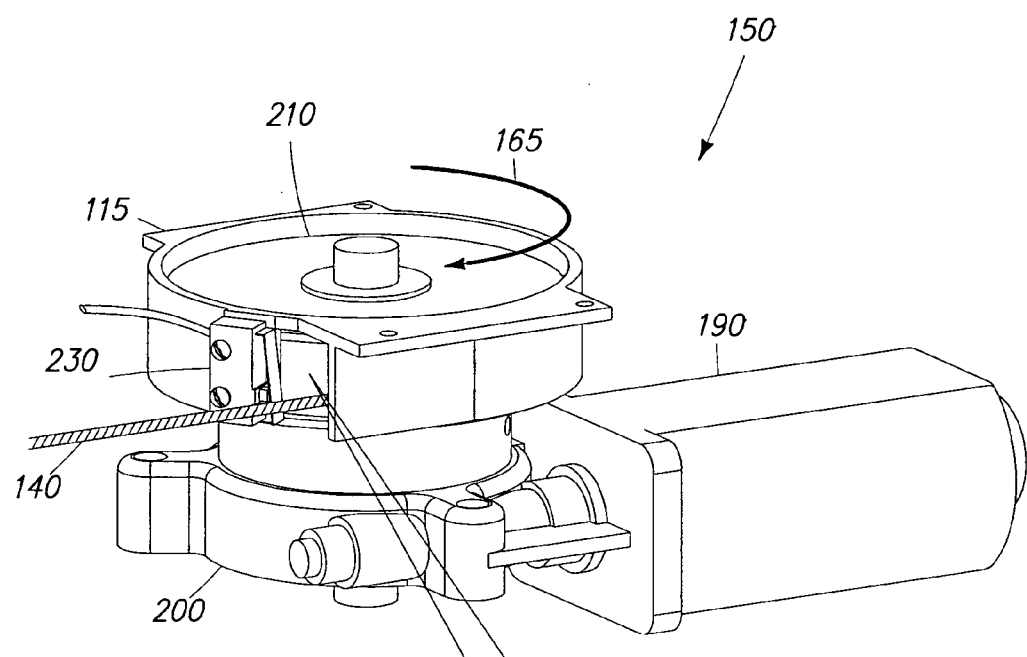
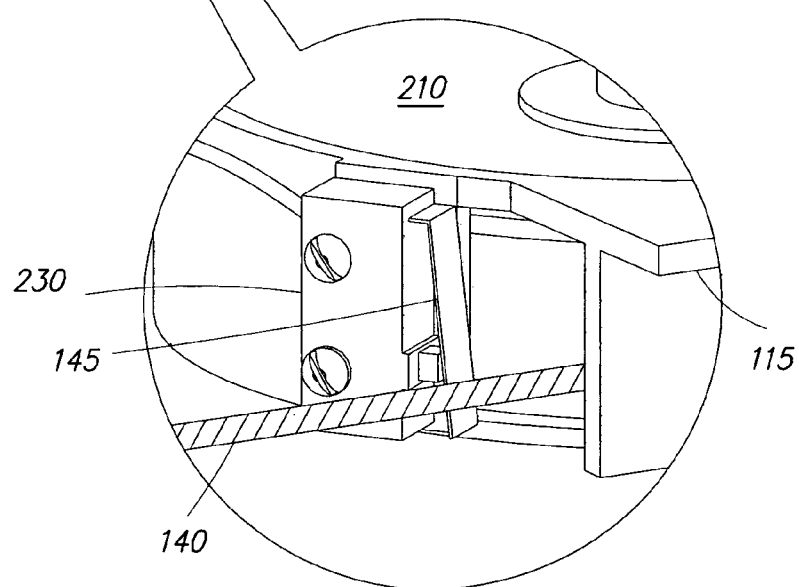
Fig. 4

| Row Numbers | Sign of ($f_m-f_o$) | Slack Sensor<br><br>1=line is taut<br>0=line is slack | Upper Limit Sensor<br><br>0=Actiavted<br>1=Not Activated | Lower Limit Sensor<br><br>0=Actiavted<br>1=Not Activated | Amplifier Command Signal |
|---|---|---|---|---|---|
| 1 | $f_m-f_o>0$ | 0 | 1 | 1 | e = 0 |
| 2 | $f_m-f_o>0$ | 0 | 1 | 0 | e = 0 |
| 3 | $f_m-f_o>0$ | 0 | 0 | 1 | e=K ($f_m-f_o$) |
| 4 | $f_m-f_o>0$ | 1 | 1 | 1 | e=K ($f_m-f_o$) |
| 5 | $f_m-f_o>0$ | 1 | 1 | 0 | e = 0 |
| 6 | $f_m-f_o>0$ | 1 | 0 | 1 | e=K ($f_m-f_o$) |
| 7 | $f_m-f_o<0$ | 0 | 1 | 1 | e=K ($f_m-f_o$) |
| 8 | $f_m-f_o<0$ | 0 | 1 | 0 | e=K ($f_m-f_o$) |
| 9 | $f_m-f_o<0$ | 0 | 0 | 1 | e = 0 |
| 10 | $f_m-f_o<0$ | 1 | 1 | 1 | e=K ($f_m-f_o$) |
| 11 | $f_m-f_o<0$ | 1 | 1 | 0 | e=K ($f_m-f_o$) |
| 12 | $f_m-f_o<0$ | 1 | 0 | 1 | e = 0 |

Fig. 26

APPARATUS AND METHOD FOR VEHICLE ON-BOARD CARGO HANDLING SYSTEM

BACKGROUND

The present invention relates generally to the field of cargo handling systems for vehicles and more specifically to the field of powered cargo handling systems utilizing a vehicle's trunk lid for support.

In a wide variety of situations, people of ordinary ability are often frustrated in attempting to load excessively heavy or bulky cargo into their vehicle trunks. Conventional devices to assist in cargo handling tend to occupy too much trunk space, to be too complicated to use, and to operate too slowly for wide acceptance by the general public. Consequently, vehicle manufacturers have usually declined to offer such conventional cargo handling devices as original equipment on their products. While manufacturers of vehicle after-market equipment do offer some lifting devices, these after-market devices are traditionally special purpose machines customized for lifting only scooters or wheelchairs for physically challenged individuals.

Opportunities exist, therefore, to provide a compact, easy-to-operate, fast, and general purpose vehicle cargo handling system.

SUMMARY

The opportunities described above are addressed in one embodiment of the present invention by an apparatus for loading an object into a vehicle, the vehicle having a trunk lid, the apparatus comprising: a line; an actuator adapted for applying a tensile force to the line in response to an actuator command, and disposed and adapted for transmitting at least a portion of the tensile force to the trunk lid; an end-effector mechanically coupled to the line and adapted for transmitting the tensile force and an operator force to the object and for generating an operator force measurement; and a controller adapted for generating the actuator command from the operator force measurement.

Another aspect of the present invention is embodied as a method for loading an object into a vehicle, the vehicle having a trunk lid, the method comprising the acts of: applying a tensile force to a line in response to an actuator command; transmitting at least a portion of a tensile force to the trunk lid; transmitting the tensile force and an operator force to the object using an end-effector; generating an operator force measurement; and generating the actuator command from the operator force measurement.

DRAWINGS

These and other features, aspects, and advantages of the present invention will become better understood when the following detailed description is read with reference to the accompanying drawings in which like characters represent like parts throughout the drawings, wherein:

FIG. 4 is a perspective drawing in accordance with another more detailed embodiment of the embodiment of FIG. 1.

FIG. 26 is a table in accordance with an embodiment of the logical performance of the invention.

DETAILED DESCRIPTION

Figure 1:
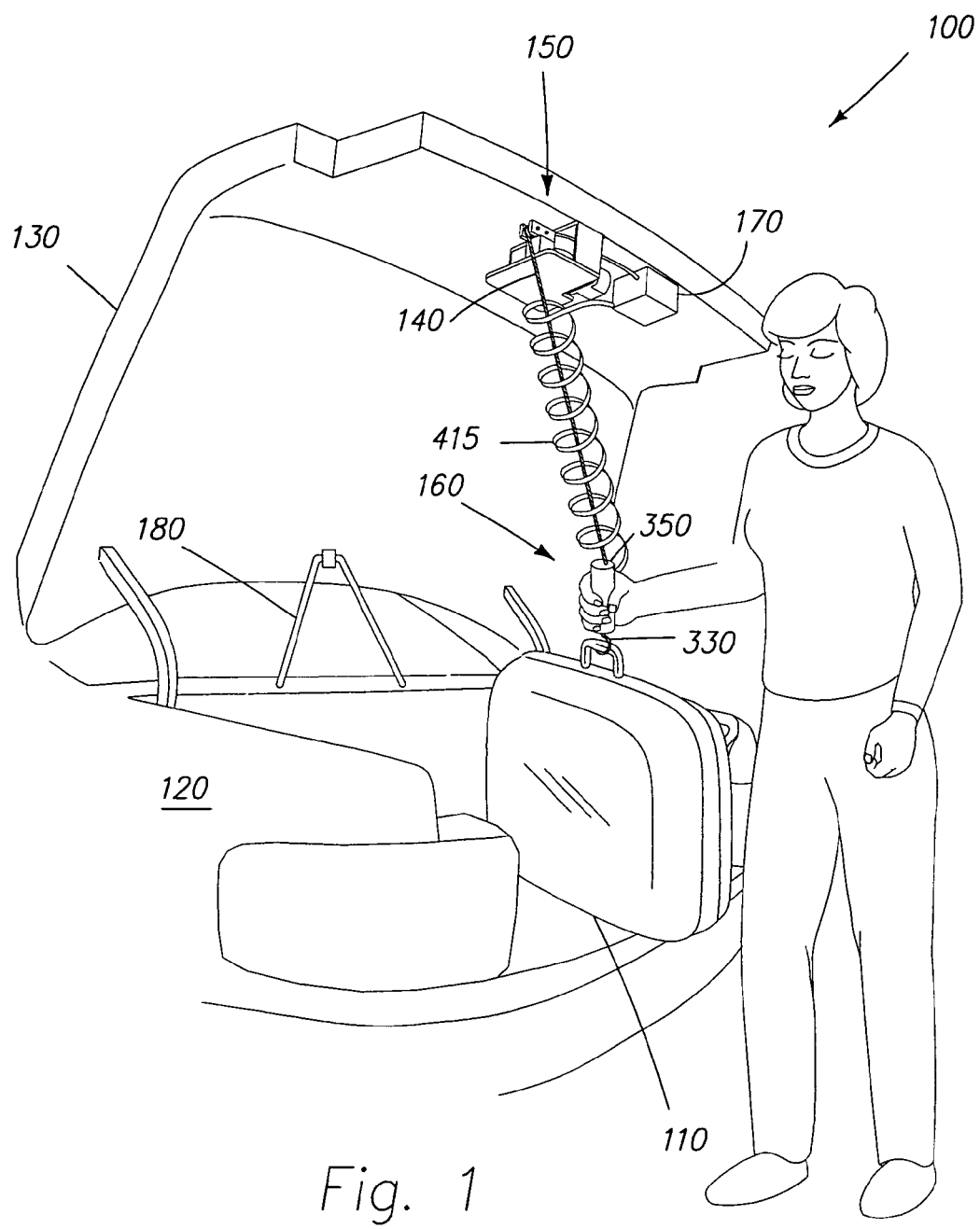
FIG. 1 is a perspective drawing in accordance with an embodiment of the present invention.

In accordance with an embodiment of the present invention, FIG. 1 is a perspective drawing illustrating an apparatus 100 for loading and unloading an object 110 into and out of a vehicle 120 where vehicle 120 has a trunk lid 130. Apparatus 100 comprises a line 140, an actuator 150, an end-effector 160, and a controller 170. In operation, actuator 150 applies a tensile force to line 140 in response to an actuator command, and is disposed so as to transmit at least a portion of the tensile force to trunk lid 130. End-effector 160 is mechanically coupled to line 140 and transmits the tensile force and an operator force to object 110 and also generates an operator force measurement. From the operator force measurement, controller 170 generates the actuator command.

Line 140 comprises any device or combination of devices capable of performing the indicated functions. Examples of line 140 include, without limitation, rope, wire, cable, belts, synthetic rope, fabric rope, plastic rope, wire rope, cord, twine, chain, bicycle-type chain, string, and combinations thereof. In some embodiments, line 140 comprises a multi-strand rope having a maximum strength greater than about 300 pounds. In some embodiments, line 140 comprises a multi-strand wire rope having a maximum strength of about 300 pounds.

Examples of object 110 include without limitation, suitcases, luggage, baggage, grocery bags, spare tires, food containers, sacks, backpacks, water jugs, tool boxes, beverage containers, barrels, and golf bags.

In some embodiments, a signal wire 415 transmits the operator force measurement to controller 170. In accordance with another embodiment of the invention, end-effector 160 is further adapted for wirelessly transmitting the operator force measurement to controller 170.

Figure 2:
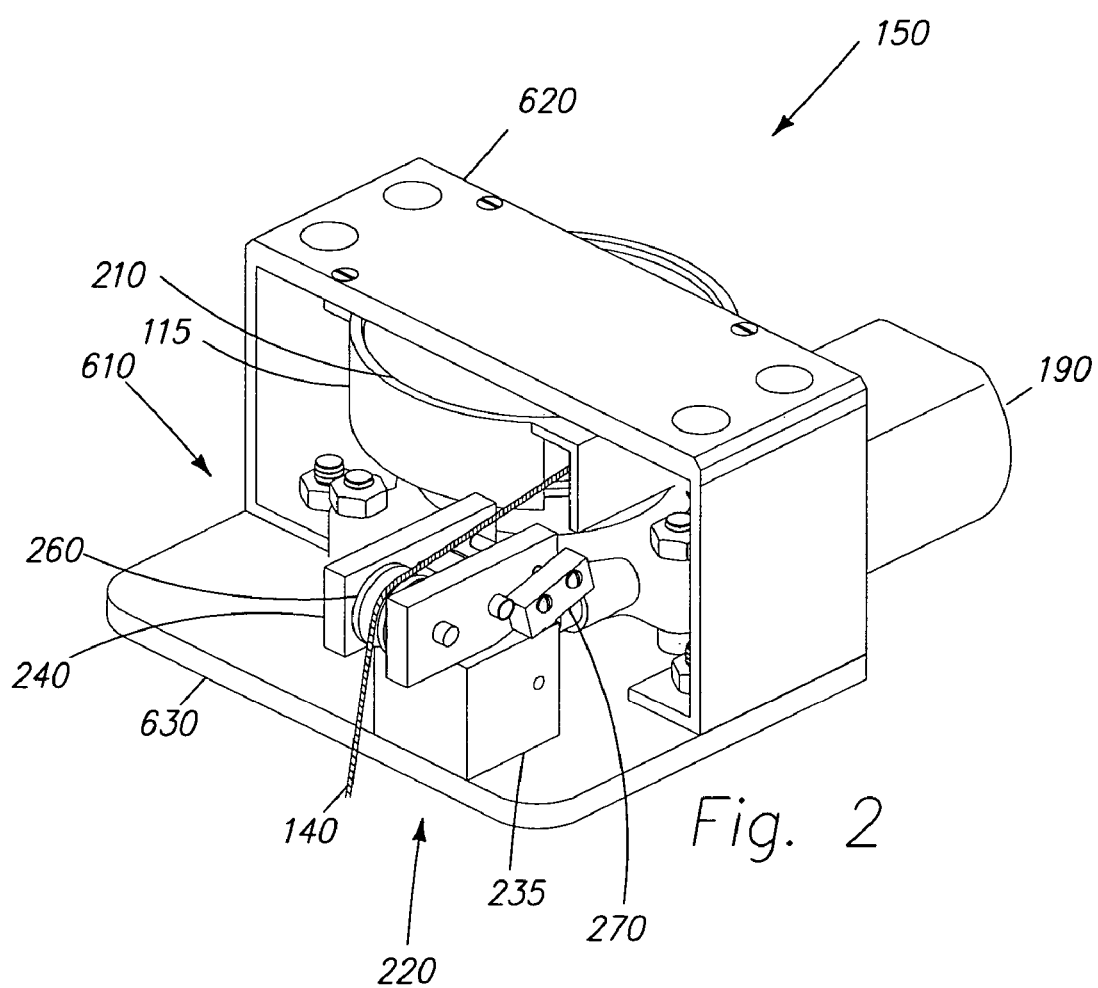
FIG. 2 is a perspective drawing in accordance with a more detailed embodiment of the embodiment of FIG. 1.
Figure 3:
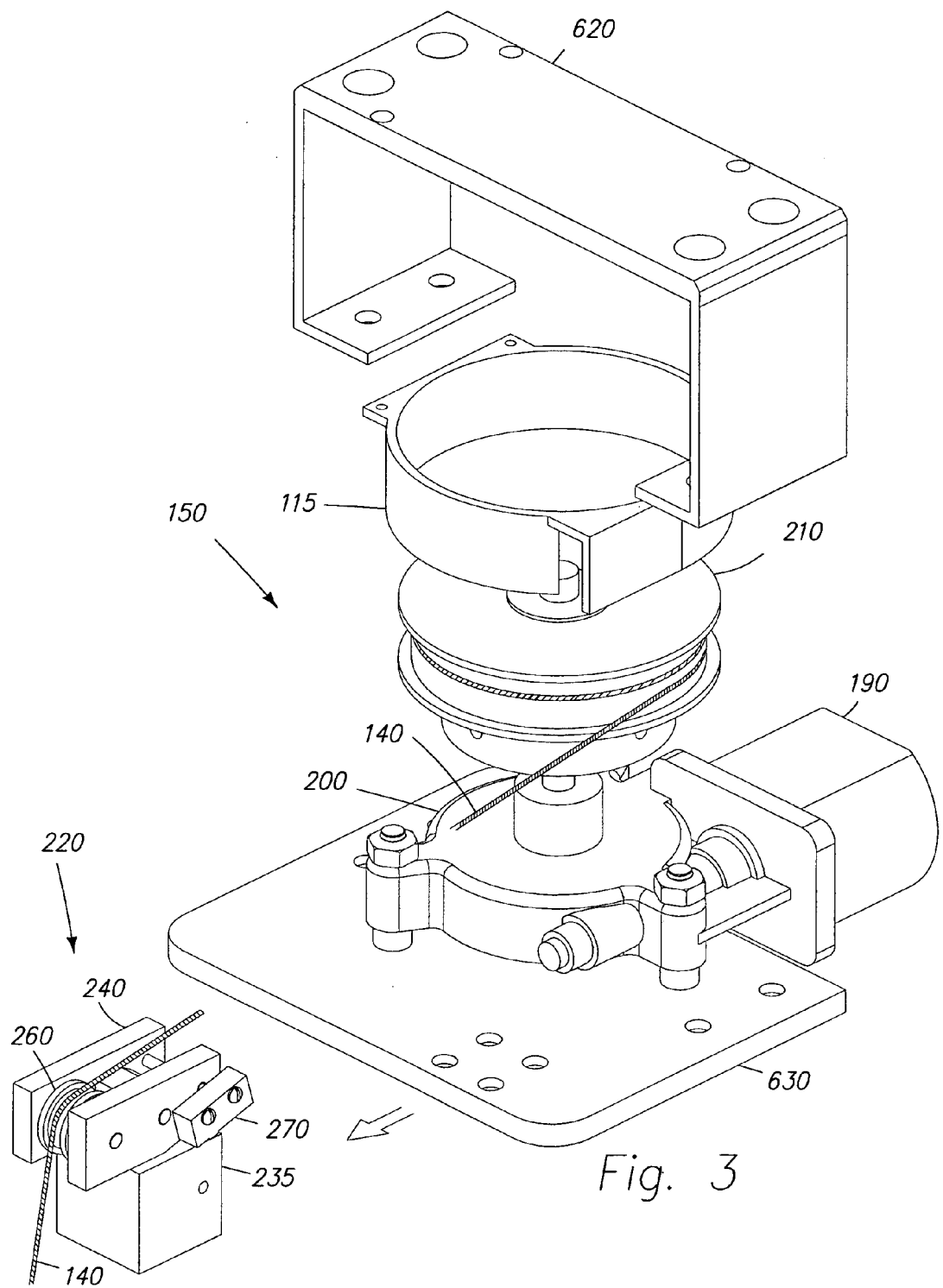
FIG. 3 is an exploded perspective drawing in accordance with the embodiment of FIG. 2.

In accordance with a more detailed embodiment of the embodiment of FIG. 1, FIG. 2 is a perspective drawing wherein actuator 150 comprises a motor 190 and a take-up pulley 210. FIG. 3 is an exploded view of FIG. 2. In operation, motor 190 generates a motor torque in response to the actuator command while take-up pulley 210 receives the motor torque and applies a tensile force to line 140.

In accordance with a more detailed embodiment of actuator 150, actuator 150 further comprises a mounting frame 610 connectable to trunk lid 130 and for transmitting at least a portion of the tensile force in line 140 to trunk lid 130. In a more detailed embodiment, mounting frame 610 comprises an upper mounting frame 620 and a lower mounting frame 630.

Motor 190 comprises any device or combination of devices capable of performing the indicated functions. Examples of motor 190 include, without limitation, hydraulic motors, pneumatic motors, and electric motors, including, without limitation, AC (alternating current) motors, brush-type DC (direct current) motors, brushless DC motors, electronically commutated motors (ECMs), stepping motors, and combinations thereof.

Take-up pulley 210 comprises any device or combination of devices capable of performing the indicated functions. Examples of take-up pulley 210 include, without limitation, drums, winches, single-groove pulleys, multi-groove pulleys, and combinations thereof. In some embodiments, actuator 150 further comprises an optional pulley cover 115 wrapped around take-up pulley 210 to ensure that line 140 will not come off the pulley groove.

In some embodiments, actuator 150 further comprises a transmission 200 mechanically coupled between motor 190 and take-up pulley 210. Transmission 200 comprises any device or combination of devices capable of performing the indicated functions. Examples of transmission 200 include, without limitation, gear trains, worm gears, bevel gears, planetary gears, pulleys, lines, belts, toothed belts, toothed pulleys, harmonic drives, and combinations thereof.

In accordance with another embodiment of the invention, FIG. 4 is a perspective drawing wherein actuator 150 further comprises a lower limit sensor 230. In operation, lower limit sensor 230 generates a lower limit signal when end-effector 160 reaches a prescribed lower limit position. In this embodiment, controller 170 generates the actuator command from the lower limit signal and from the operator force measurement.

Lower limit sensor 230 comprises any device or combination of devices capable of performing the indicated functions. Examples of lower limit sensor 230 include, without limitation, switches and sensors or pick-ups capable of sensing the proximity of line 140 by magnetic, electrical, or optical means or combinations thereof.

Figure 5:
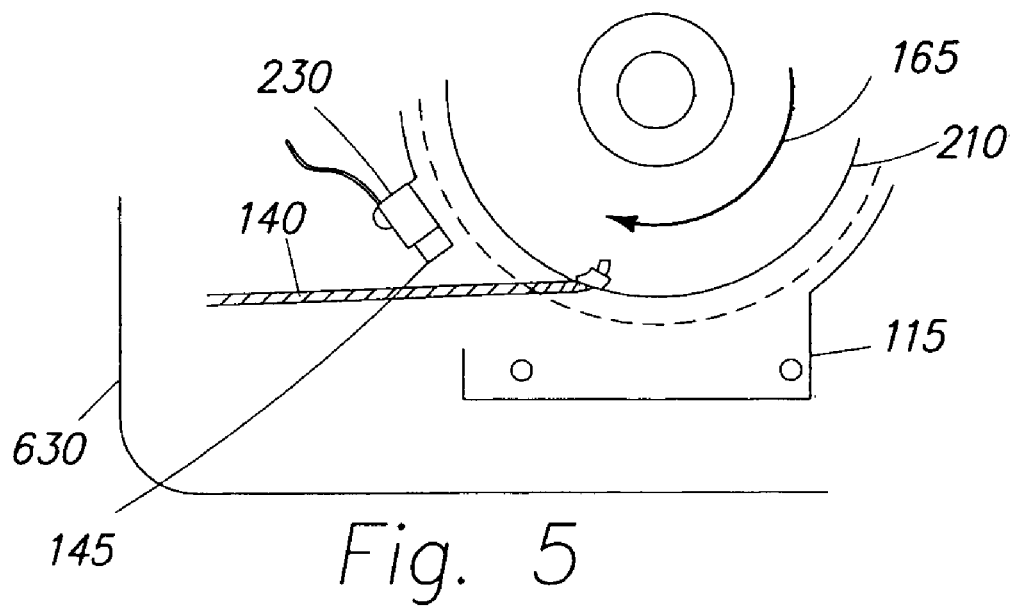
FIG. 5 is an orthographic drawing in accordance with another configuration of the embodiment of FIG. 4.
Figure 6:
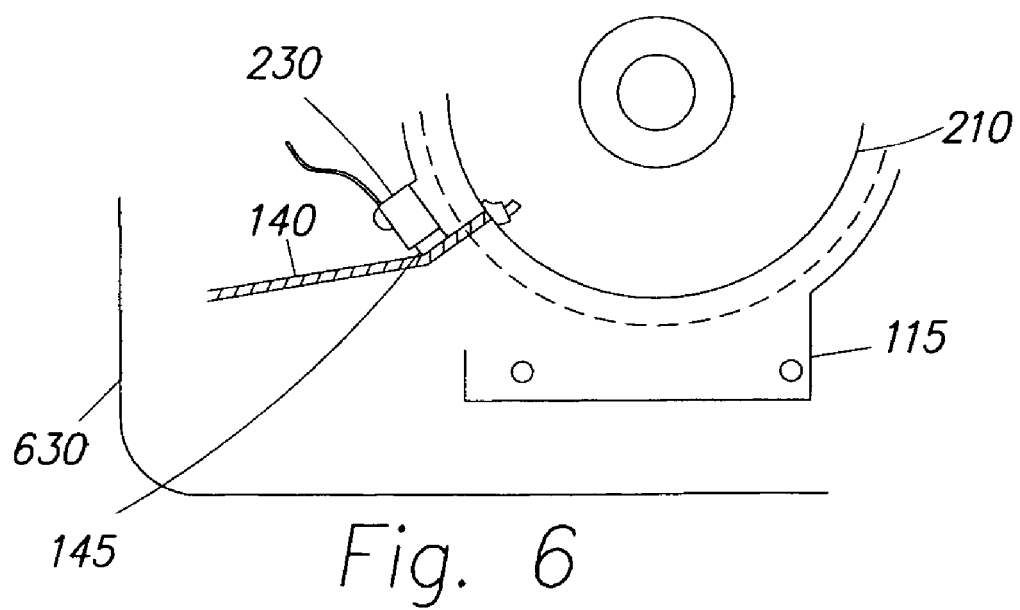
FIG. 6 is another orthographic drawing in accordance with another configuration of the embodiment of FIG. 4.

In some embodiments, lower limit sensor 230 comprises a limit switch including a switch lever 145. When take-up pulley 210 turns along arrow 165 and line 140 pushes switch lever 145, lower limit sensor 230 generates the lower limit signal. FIG. 5 shows actuator 150 just before lower limit sensor 230 is activated; FIG. 6 shows actuator 150 just after lower limit sensor 230 is activated.

Figure 7:
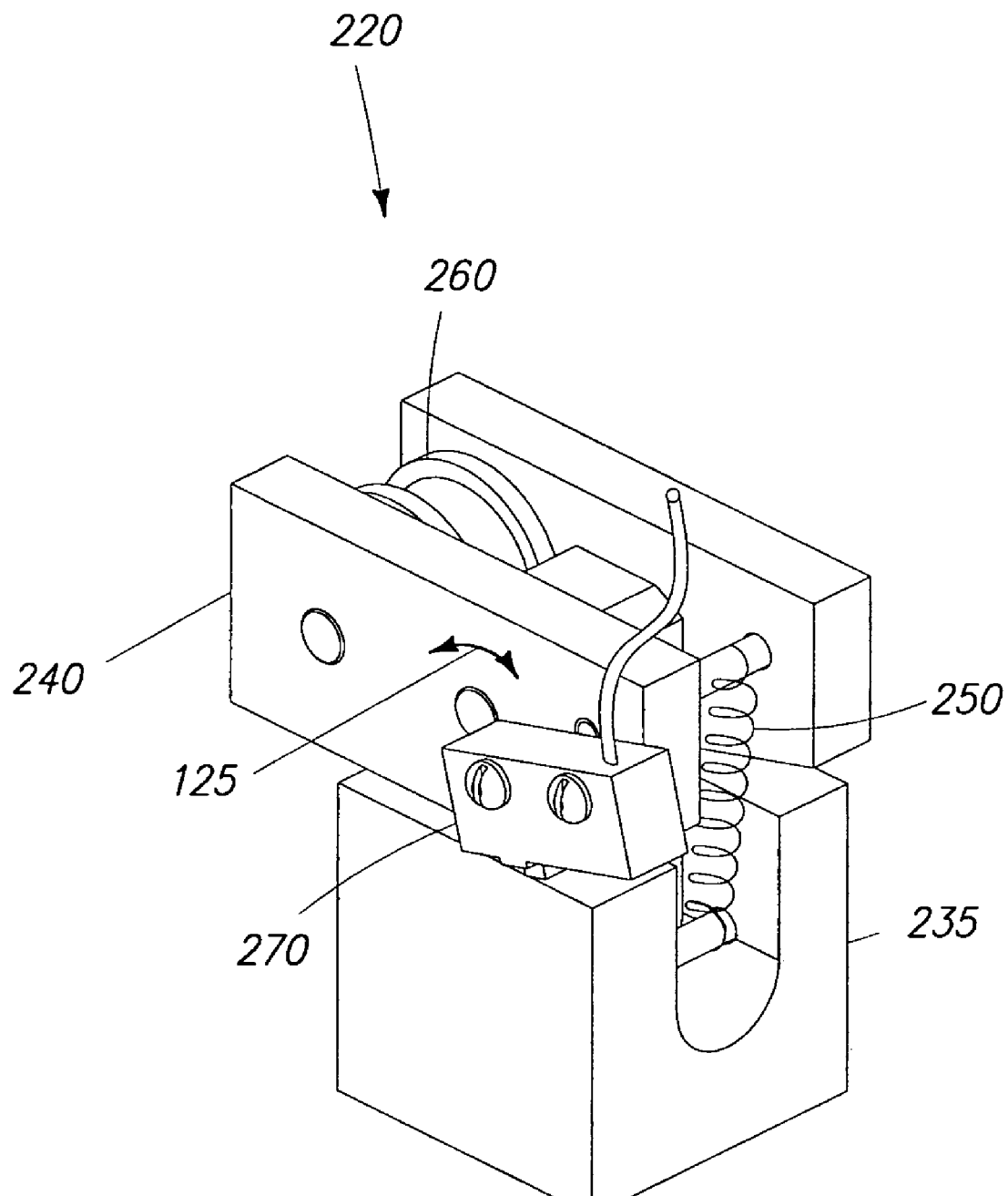
FIG. 7 is a perspective drawing in accordance with a more detailed embodiment of the embodiment of FIG. 2.

In accordance with a more detailed embodiment of the invention, FIG. 7 is a perspective drawing wherein actuator 150 further comprises a slack sensor 220. In operation, slack sensor 220 generates a slack signal when line 140 becomes slack (i.e., when the tension in line 140 drops below a desired level). In some embodiments, slack sensor 220 also redirects line 140. Controller 170 generates the actuator command from the slack signal and from the operator force measurement. Slack sensor 220 comprises any device or combination of devices capable of performing the indicated function.

In accordance with a more detailed embodiment, slack sensor 220 further comprises a base block 235, an upper assembly 240, a line guide 260, a bias spring 250, and a load sensor 270. Upper assembly 240 is rotatably coupled to (i.e., coupled to permit rotation with respect to) base block 235 and, in operation, rotates with respect to base block 235 along arrow 125 as a function of line tension in line 140.

Line guide 260 is rotatably coupled to upper assembly 240 and redirects line 140. Mechanically coupled between upper assembly 240 and base block 235, bias spring 250 exerts a bias force on upper assembly 240. When line tension is insufficient to overcome the bias force, load sensor 270 generates the slack signal. In the embodiment of FIG. 7, load sensor 270 is mechanically coupled to upper assembly 240.

Figure 8:
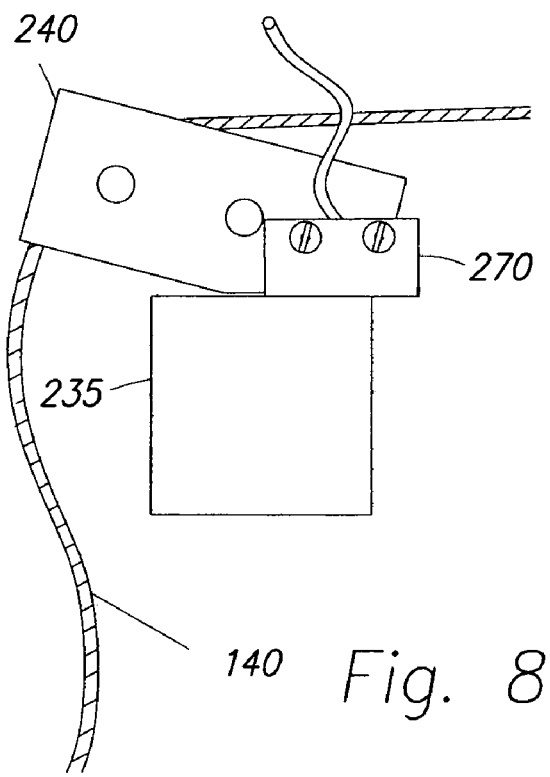
FIG. 8 is an orthographic drawing in accordance with another configuration of the embodiment of FIG. 7.
Figure 9:
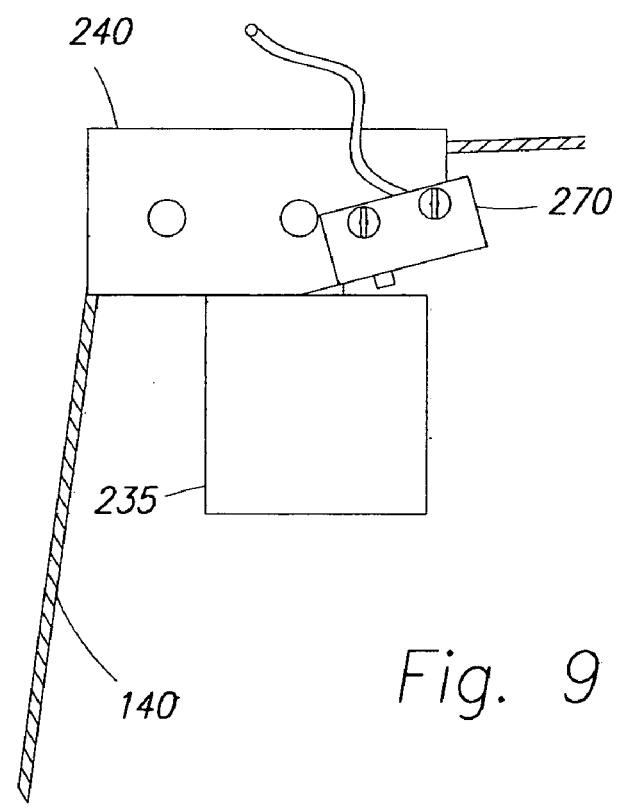
FIG. 9 is another orthographic drawing in accordance with another configuration of the embodiment of FIG. 7.

In some embodiments, load sensor 270 is a limit switch. When line tension is insufficient to overcome the bias force, load sensor 270 encounters base block 235 and generates the slack signal as shown in FIG. 8. FIG. 9 shows the configuration where the line is taut.

Figure 10:
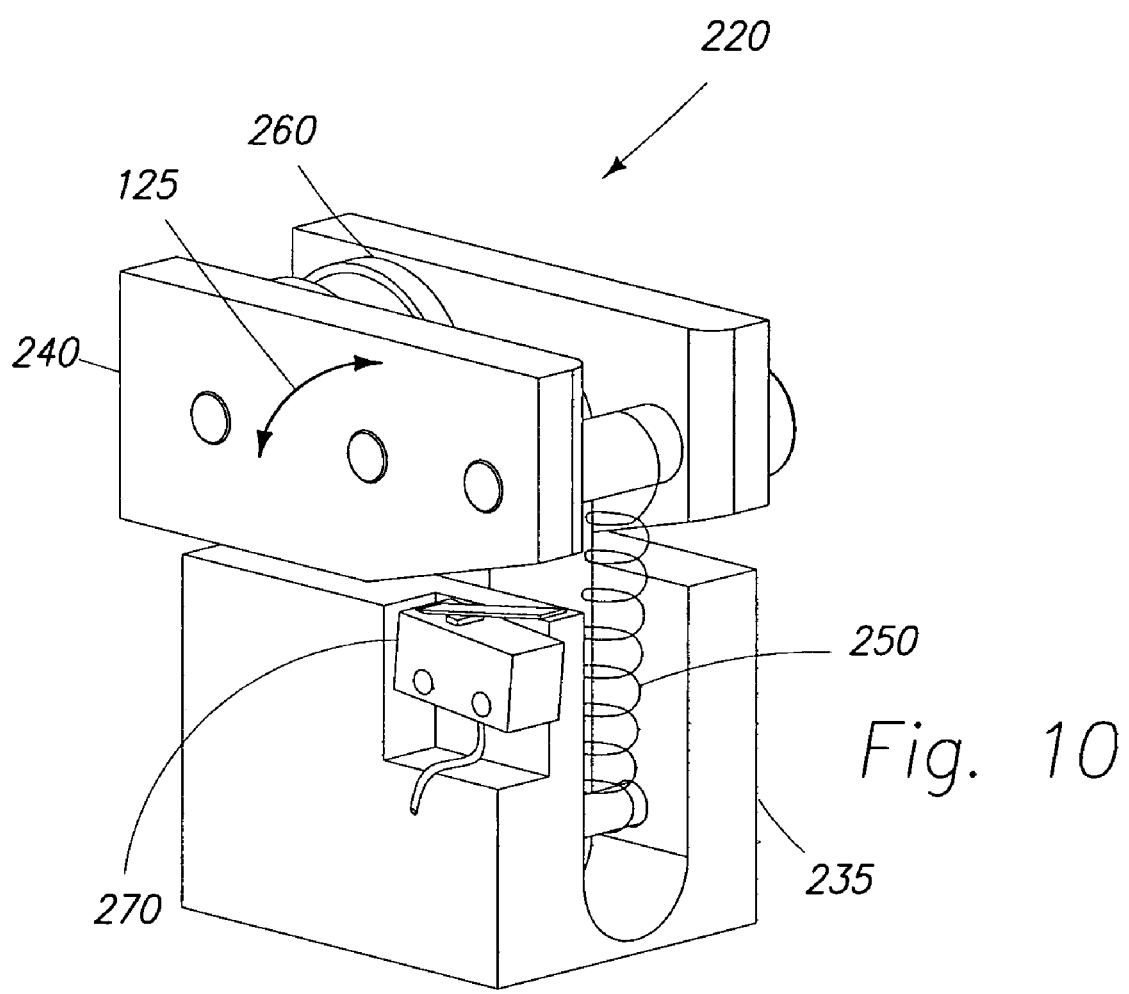
FIG. 10 is a perspective drawing in accordance with another more detailed embodiment of the embodiment of FIG. 2.

In accordance with another more detailed embodiment of the embodiment of FIG. 2, FIG. 10 is a perspective drawing wherein load sensor 270 is mechanically coupled to base block 235.

Load sensor 270 comprises any device or combination of devices capable of performing the indicated functions. Examples of load sensor 270 include, without limitation, switches and sensors or pick-ups capable of sensing the proximity of upper assembly 240 to base block 235 by magnetic, electrical, or optical means or combinations thereof.

Line guide 260 comprises any device or combination of devices capable of performing the indicated functions. Examples of line guide 260 include, without limitation, pulleys, sprockets, dowels, sleeves, channels, and combinations thereof.

Figure 11:
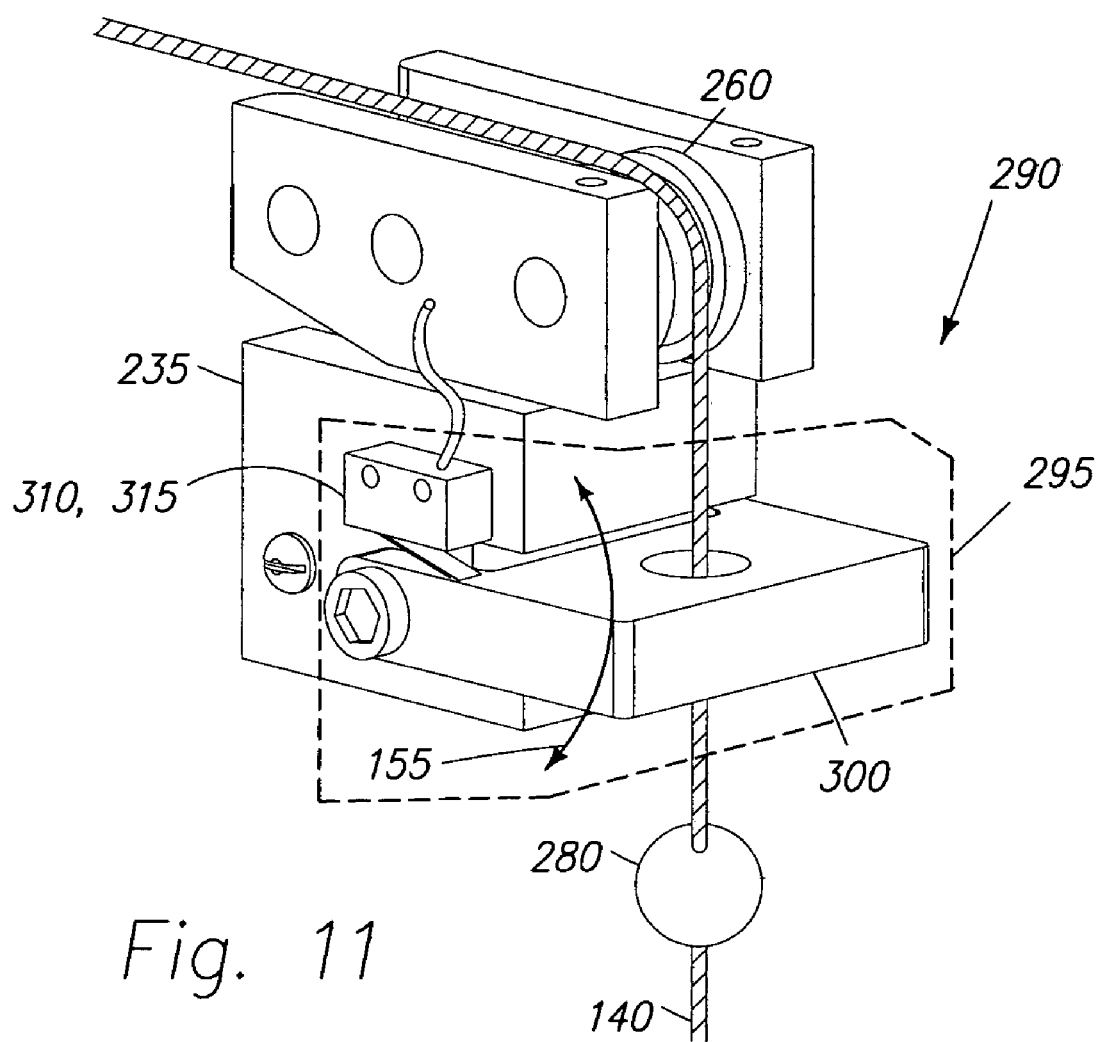
FIG. 11 is a perspective drawing in accordance with another more detailed embodiment of the embodiment of FIG. 2.

In accordance with another more detailed embodiment of the invention, FIG. 11 is a perspective drawing wherein actuator 150 further comprises an upper limit sensor 290. In operation, upper limit sensor 290 generates an upper limit signal when end-effector 160 reaches a prescribed upper limit position.

In accordance with another more detailed embodiment of the invention, upper limit sensor 290 comprises an upper limit marker 280 and a marker detector 295. Upper limit marker 280 is mechanically coupled to line 140. In operation, marker detector 295 generates an upper limit signal when upper limit marker 280 reaches the prescribed upper limit position.

In some embodiments, upper limit marker 280 comprises a rubber object.

Marker detector 295 comprises any device or combination of devices capable of performing the indicated function. Examples of marker detector 295 include, without limitation, switches and sensors or pick-ups capable of sensing the proximity of upper limit marker 280 by magnetic, electrical, or optical means or combinations thereof.

In accordance with a more detailed embodiment, marker detector 295 comprises an upper limit bracket 300 and a contact sensor 310. Line 140 passes through an opening in upper limit bracket 300. The opening is shaped so as to prevent upper limit marker 280 from passing through. In operation, contact sensor 310 generates the upper limit signal as a function of a contact force between upper limit marker 280 and upper limit bracket 300.

In a more detailed embodiment, marker detector 295 further comprises a base block 235 and contact sensor 310 comprises a limit switch 315. Upper limit bracket 300 is rotatably coupled to base block 235 allowing motion along arrow 155. In operation, limit switch 315 generates an upper limit signal when the contact force causes sufficient rotation of upper limit bracket 300 with respect to base block 235.

Figure 12:
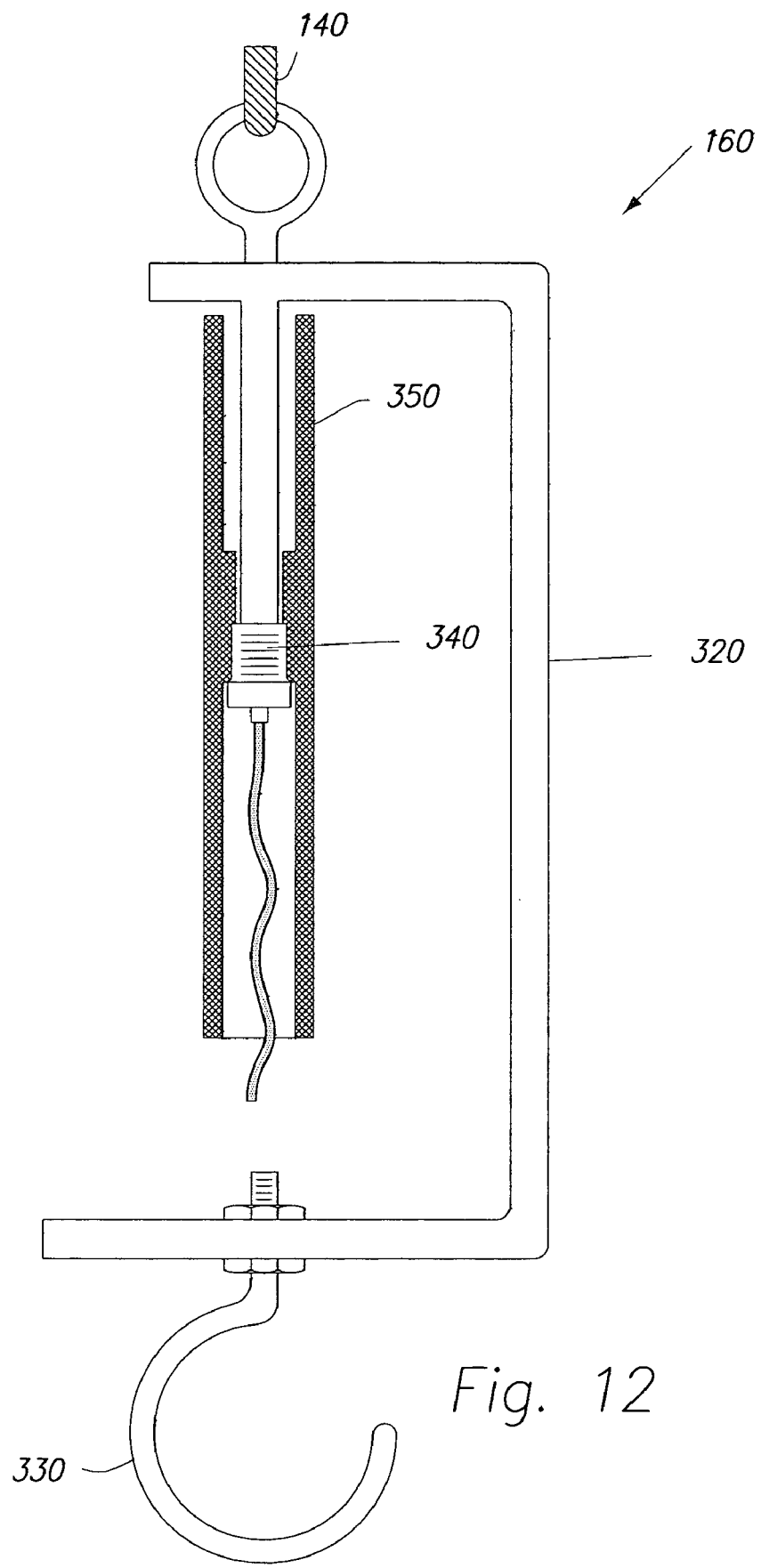
FIG. 12 is an orthographic drawing in accordance with another more detailed embodiment of the embodiment of FIG. 1.

In accordance with another more detailed embodiment of the embodiment of FIG. 1, FIG. 12 is an orthographic drawing wherein end-effector 160 comprises an end-effector frame 320, a cargo interface 330, an operator force sensor 340, and a handle 350. End-effector frame 320 is mechanically coupled to line 140. Cargo interface 330 is mechanically coupled to end-effector frame 320 and, in operation, transmits the tensile force to object 110; operator force sensor 340 is mechanically coupled to end-effector frame 320 and generates the operator force measurement; handle 350 is mechanically coupled to operator force sensor 340 and transmits the operator force to operator force sensor 340.

Operator force sensor 340 comprises any device or combination of devices capable of performing the indicated functions. Examples of operator force sensor 340 include, without limitation, piezoelectric force sensors, metallic strain gage force sensors, semiconductor strain gage force sensors, Wheatstone bridge-deposited strain gage force sensors, force sensing resistors, and combinations thereof.

Cargo interface 330 comprises any device or combination of devices capable of performing the indicated function. Examples of cargo interface 330 include, without limitation, hooks, suction cups, grippers, magnets, and combinations thereof.

Figure 13:
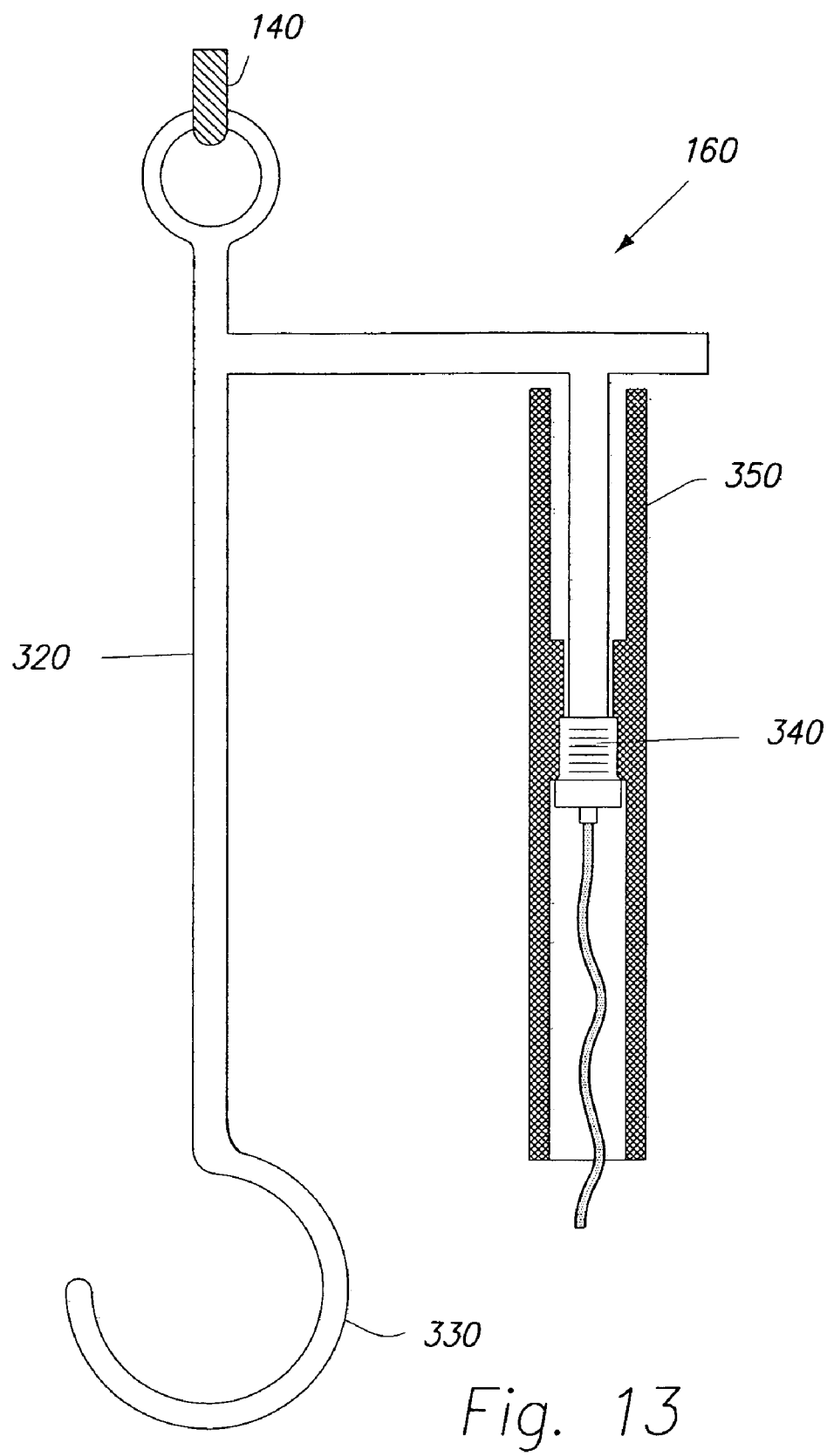
FIG. 13 is an orthographic drawing in accordance with a more detailed embodiment of the embodiment of FIG. 12.

In accordance with a more detailed embodiment of the embodiment of FIG. 12, FIG. 13 is an orthographic drawing wherein a longitudinal axis of handle 350 does not pass through cargo interface 330.

Figure 14:
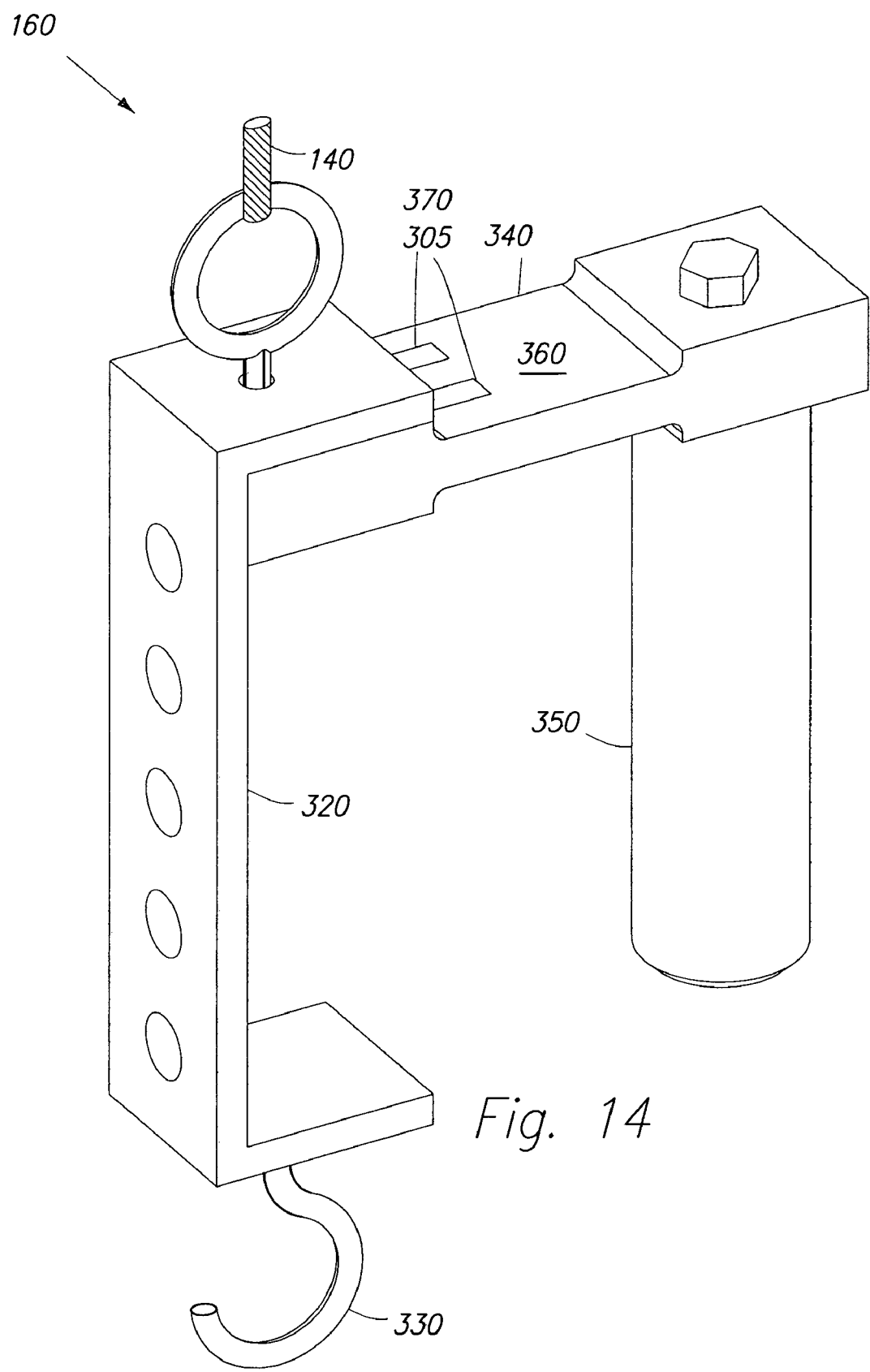
FIG. 14 is a perspective drawing in accordance with another more detailed embodiment of the embodiment of FIG. 12.

In accordance with another more detailed embodiment of the embodiment of FIG. 12, FIG. 14 is a perspective drawing wherein operator force sensor 340 comprises a compliant element 360 and a handle displacement sensor 370. Compliant element 360 is disposed between handle 350 and end-effector frame 320. In operation, handle displacement sensor 370 senses a deformation of compliant element 360 with the operator force measurement being a function of the deformation.

In some embodiments, handle displacement sensor 370 comprises two strain gages 305 attached to the top surface of compliant element 360 and two strain gages (not shown) attached to the bottom surface of compliant element 360.

Figure 15:
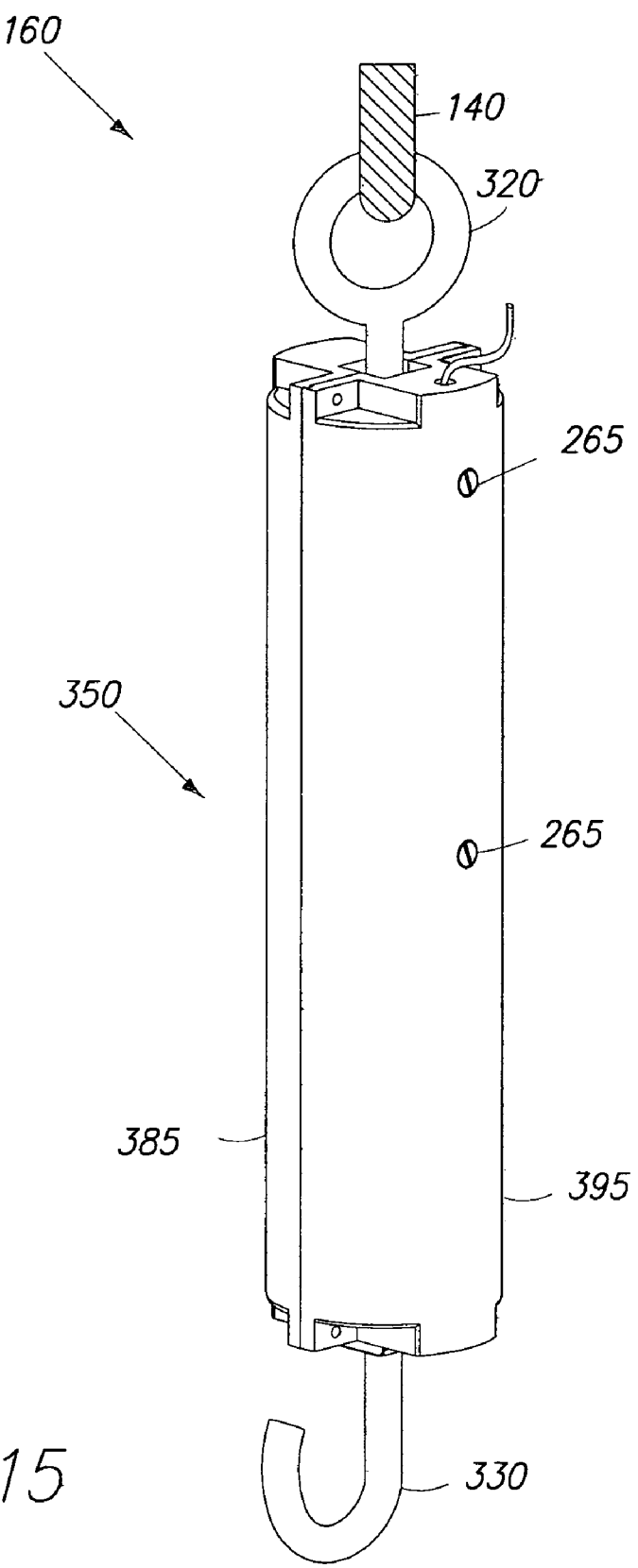
FIG. 15 is a perspective drawing in accordance with another more detailed embodiment of the embodiment of FIG. 12.
Figure 16:
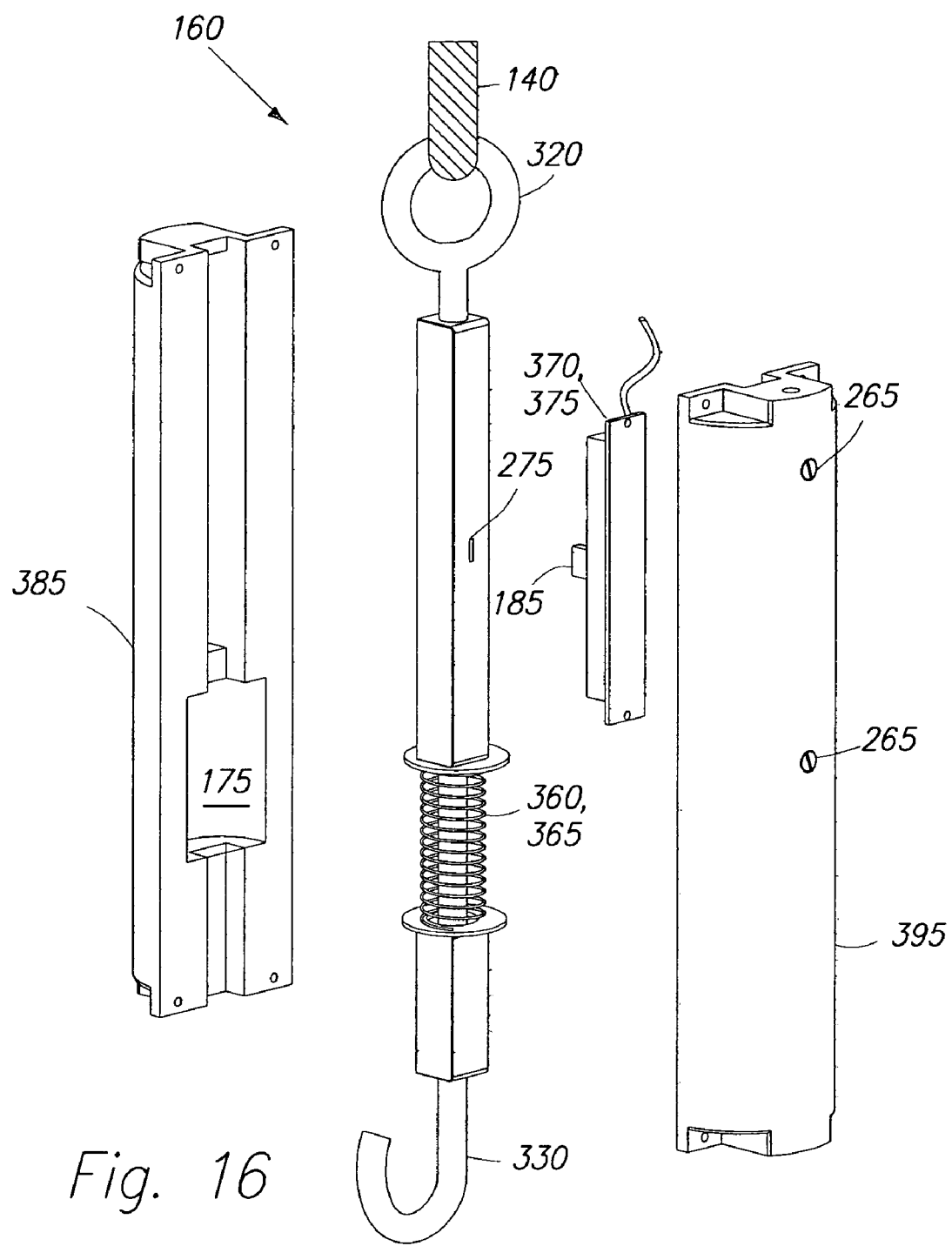
FIG. 16 is an exploded perspective drawing in accordance with the embodiment of FIG. 15.

In accordance with another more detailed embodiment of the embodiment of FIG. 12, FIG. 15 is a perspective drawing and FIG. 16 is an exploded perspective drawing wherein compliant element 360 comprises at least one compression spring 365. In some embodiments, handle 350 slides over end-effector frame 320 and comprises two handle halves 385 and 395 fastened together. Both handle halves 385 and 395 include cavities 175 to house compression spring 365.

In accordance with a more detailed embodiment of the invention, handle displacement sensor 370 comprises a linear potentiometer 375. Slider 185 of linear potentiometer 375 is coupled to end-effector frame 320 (e.g., by insertion in a hole 275), while linear potentiometer 375 is coupled to handle 350 (e.g. via fasteners 265). In operation, linear potentiometer 375 senses the deformation of compression spring 365 with the operator force measurement being a function of the deformation. In some embodiments slider 185 is coupled to handle 350 while linear potentiometer 375 is coupled to end-effector frame 320.

Handle displacement sensor 370 comprises any device or combination of devices capable of performing the indicated functions. Examples of handle displacement sensor 370 include, without limitation, linear potentiometers, slide potentiometers, magnetic linear encoders, optical linear encoders, linear variable differential transformers, capacitive displacement sensors, eddy current proximity sensors, variable-inductance proximity sensors, rocker switches, slide switches, and combinations thereof.

Figure 17:
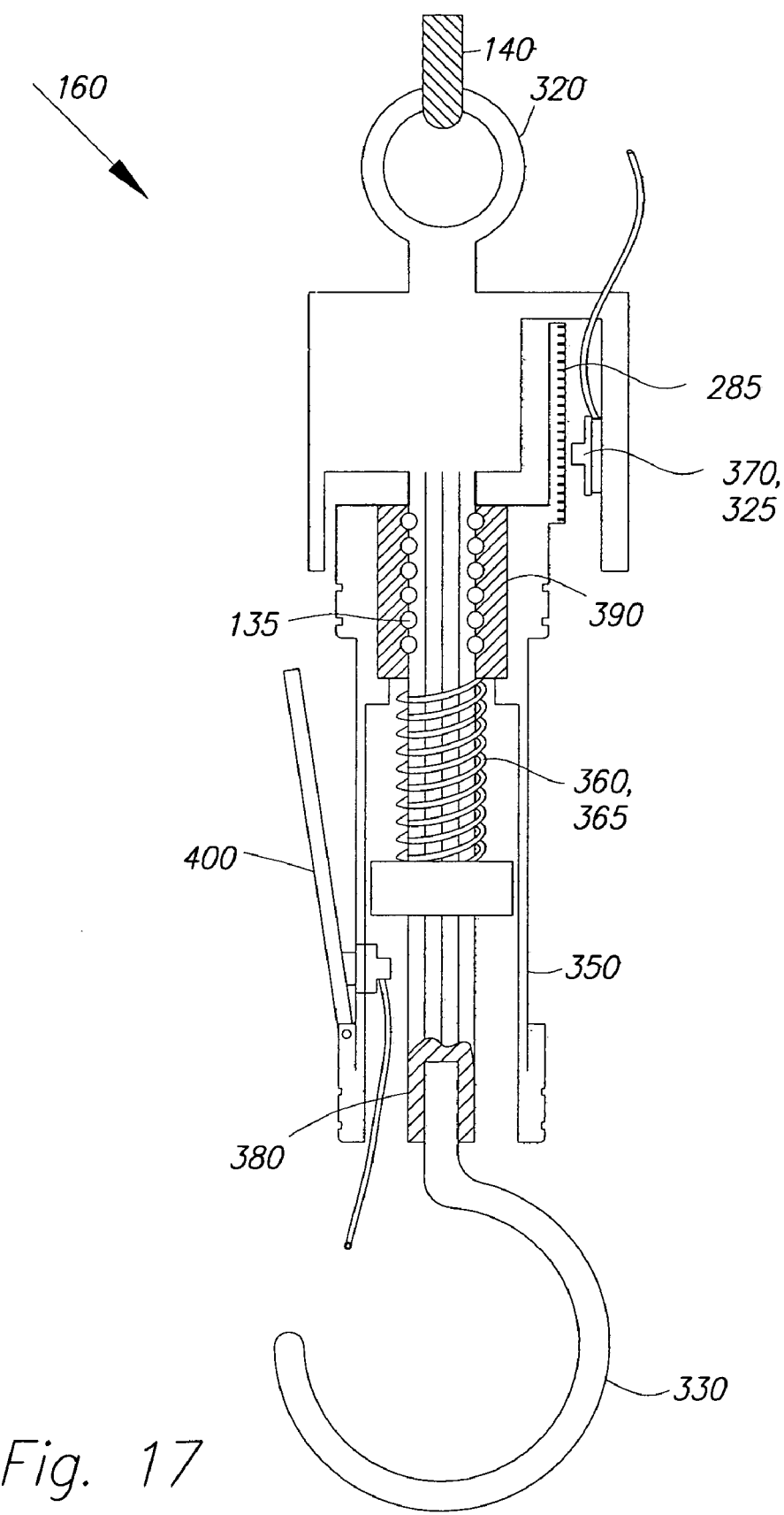
FIG. 17 is an orthographic drawing in accordance with another more detailed embodiment of the embodiment of FIG. 12.

In accordance with another more detailed embodiment of the embodiment of FIG. 12, FIG. 17 is an orthographic drawing wherein end-effector frame 320 comprises a spline shaft 380, and handle 350 comprises a ball nut 390 coupling spline shaft 380. Balls 135 located in the grooves of spline shaft 380 facilitate linear motion of ball nut 390 and handle 350 along spline shaft 380. In accordance with another more detailed embodiment of the invention, handle displacement sensor 370 comprises an optical linear encoder 325 that generates pulses as it observes light or dark regions of reflective strip 285.

In accordance with another more detailed embodiment of FIG. 17, handle 350 further comprises a handle switch 400. In operation, handle switch 400 generates a handle switch signal indicating whether handle 350 is grasped or released. Controller 170 generates the actuator command from the handle switch signal and from the operator force measurement. In some embodiments, controller 170 is adapted to hold actuator 150 stationary when handle switch 400 is not grasped by the operator.

Figure 18:
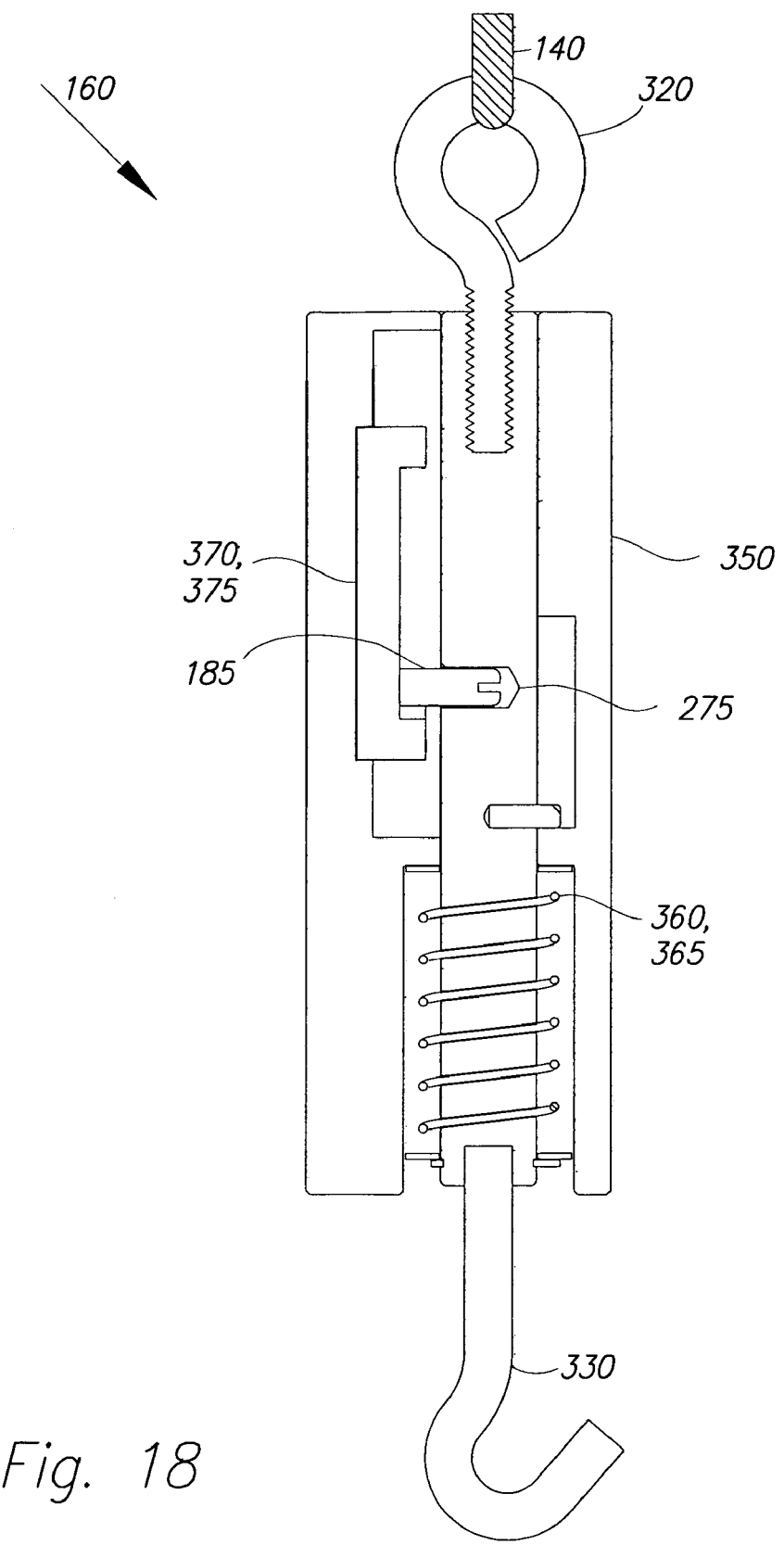
FIG. 18 is an orthographic drawing in accordance with another more detailed embodiment of the embodiment of FIG. 12.

In accordance with another more detailed embodiment of the embodiment of FIG. 12, FIG. 18 is an orthographic drawing wherein compliant element 360 comprises at one compression spring 365. Handle 350 slides over end-effector frame 320 and comprises two handle halves fastened together. This embodiment generates the operator force measurement only when a downward force is exerted on handle 350. In accordance with a more detailed embodiment of the invention, handle displacement sensor 370 comprises a linear potentiometer 375. Slider 185 of linear potentiometer 375 is coupled to end-effector frame 320 (e.g., by insertion in a hole 275), while linear potentiometer 375 is coupled to handle 350. In operation, linear potentiometer 375 senses the deformation of compression spring 365 with the operator force measurement being a function of the deformation. In some embodiments slider 185 is coupled to handle 350 while linear potentiometer 375 is coupled to end-effector frame 320.

Figure 19:
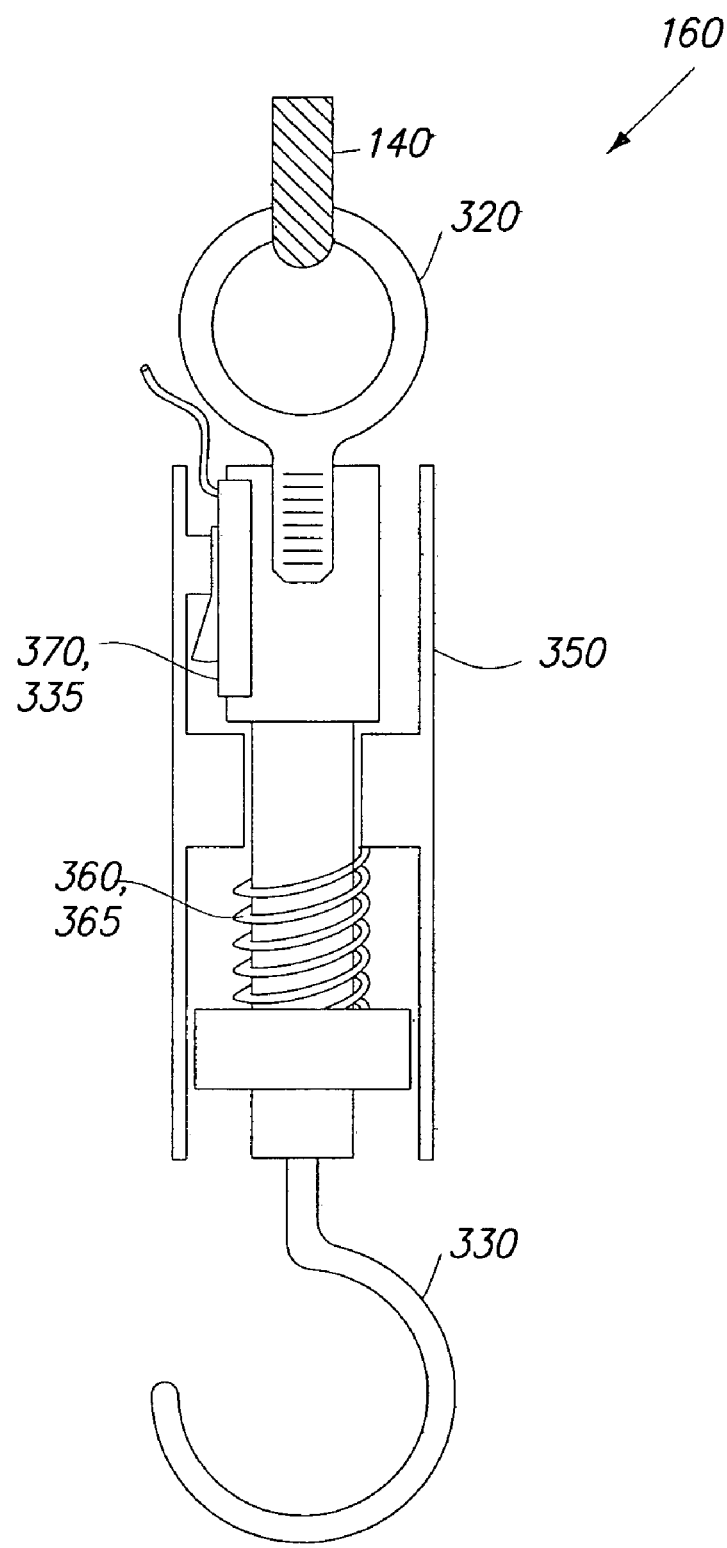
FIG. 19 is an orthographic drawing in accordance with another more detailed embodiment of the embodiment of FIG. 12.
Figure 20:
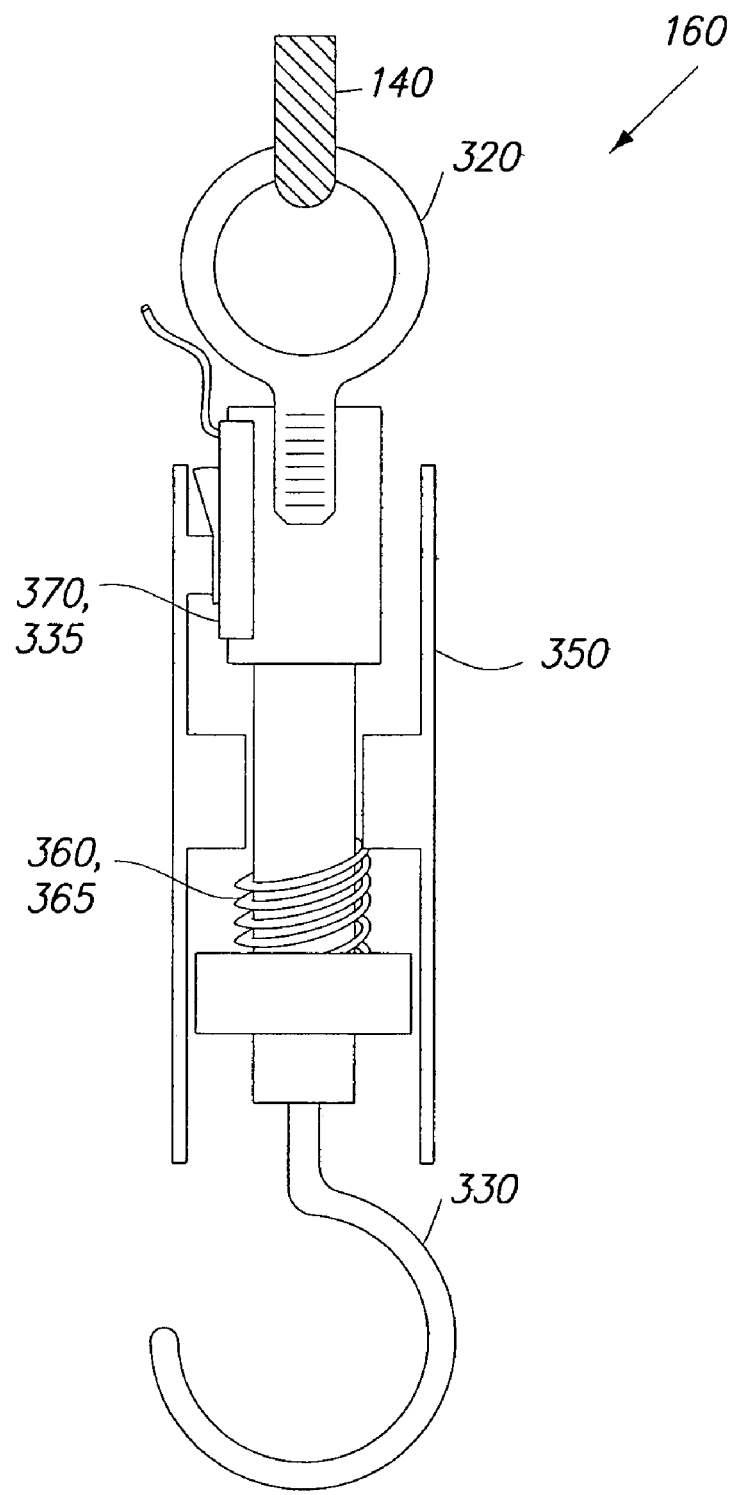
FIG. 20 is an orthographic drawing in accordance with another configuration of the embodiment of FIG. 19.

In accordance with another more detailed embodiment of the embodiment of FIG. 12, FIG. 19 is an orthographic drawing wherein handle displacement sensor 370 comprises a rocker switch 335. This embodiment generates the operator force measurement only when a downward force is exerted on handle 350. FIG. 19 shows end-effector 160 with handle 350 is moved upwardly depressing the upper side of rocker switch 335. When handle 350 is moved downwardly, the lower side of rocker switch 335 is depressed (FIG. 20).

Figures 21, 22, 23:
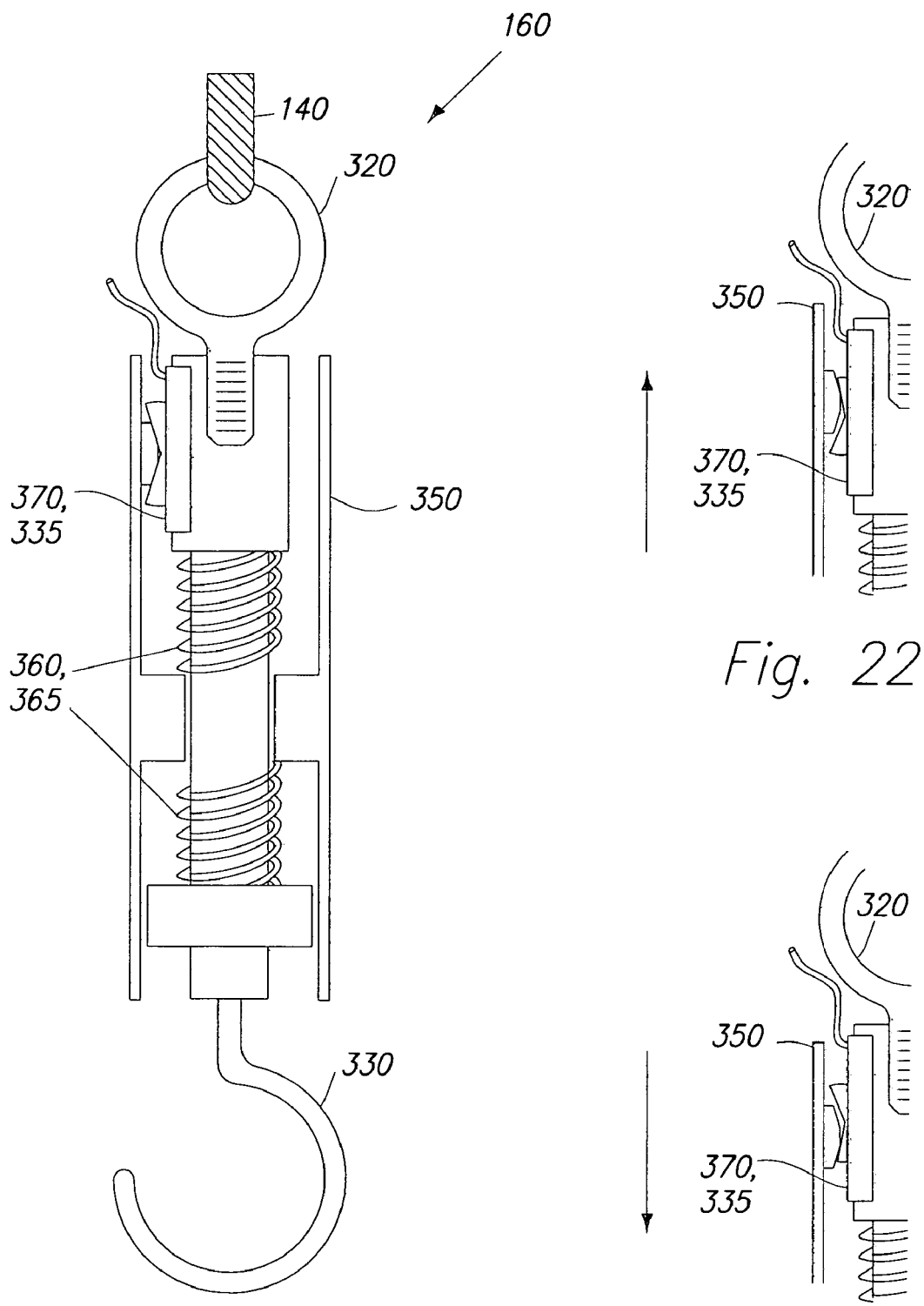
FIG. 21 is an orthographic drawing in accordance with another more detailed embodiment of the embodiment of FIG. 12.
FIG. 22 is an orthographic drawing in accordance with another configuration of the embodiment of FIG. 21.
FIG. 23 is another orthographic drawing in accordance with another configuration of the embodiment of FIG. 21.

In accordance with another more detailed embodiment of the embodiment of FIG. 12, FIG. 21 is an orthographic drawing wherein compliant element 360 comprises two compression springs 365, and handle displacement sensor 370 comprises a rocker switch 335. This embodiment generates the operator force measurement both when upward and downward forces are exerted on handle 350. FIG. 21 shows end-effector 160 when handle 350 is in its neutral position. FIG. 22 shows end-effector 160 when handle 350 is pushed upwardly and rocker switch 335 is in the pressed position on its upper side. FIG. 23 shows end-effector 160 when handle 350 is pushed downwardly and rocker switch 335 is pressed on its lower side.

Figure 24:
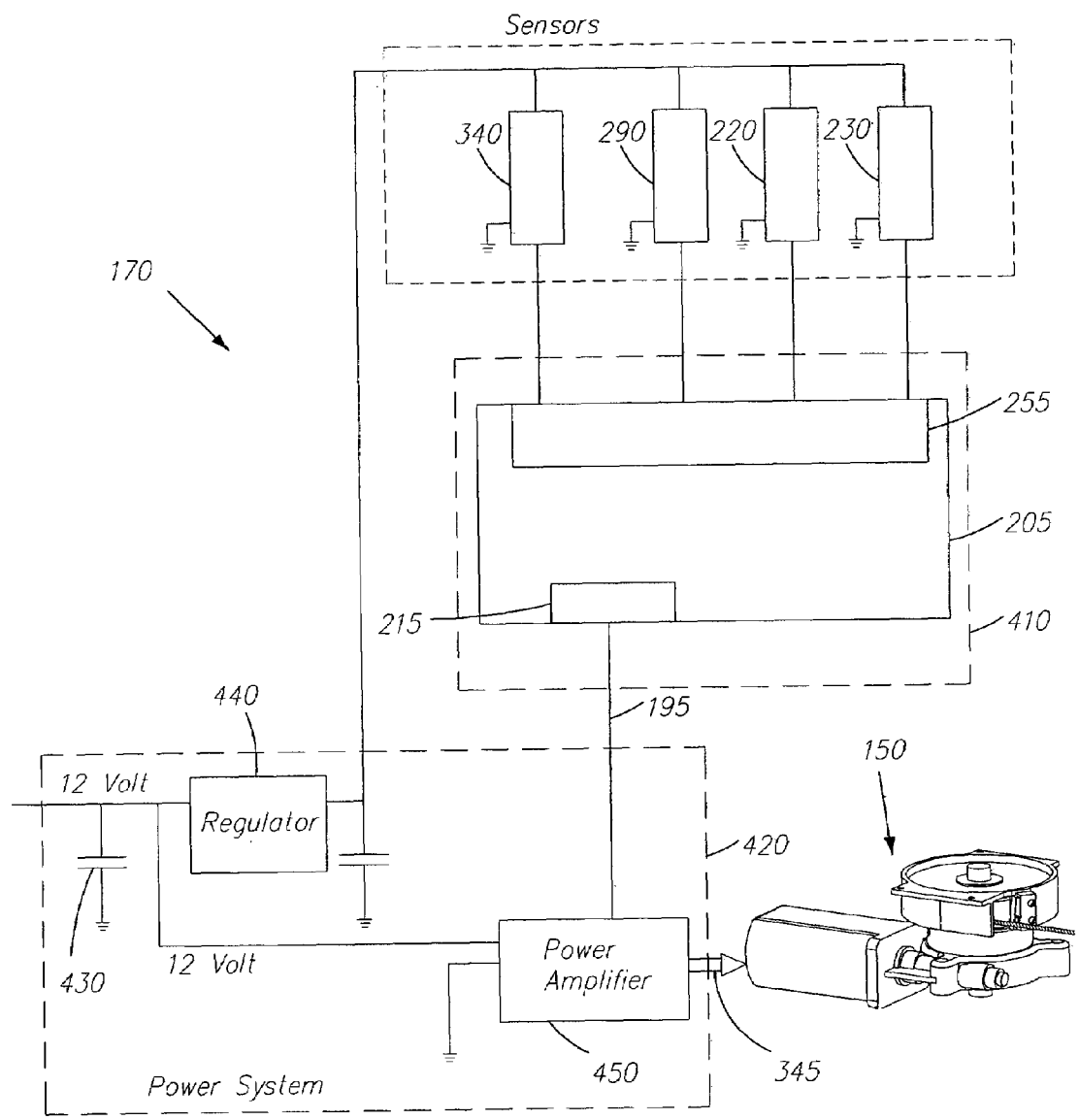
FIG. 24 is a schematic drawing in accordance with another more detailed embodiment of the embodiment of FIG. 1.

In accordance with another more detailed embodiment of the embodiment of FIG. 1, FIG. 24 is a schematic drawing wherein controller 170 comprises a signal processor 410 and a power system 420. In operation, signal processor 410 generates an amplifier command signal 195 from the operator force measurement; power system 420 generates actuator command 345 from amplifier command signal 195.

Signal processor 410 comprises any device or combination of devices capable of performing the indicated functions. Examples of such devices include, without limitation: analog devices; analog computation modules; digital devices including, without limitation, small-, medium-, and large-scale integrated circuits, application specific integrated circuits (ASICs), programmable gate arrays (PGAs), and programmable logic arrays (PLAs); and digital computation modules including, without limitation, microcomputers, microprocessors, microcontrollers, and programmable logic controllers (PLCs).

In some embodiments, signal processor 410 comprises electromechanical relays or MOSFET switches.

In accordance with another detailed embodiment of the invention, signal processor 410 generates amplifier command signal 195 from any signal or combination of signals generated by upper limit sensor 290, lower limit sensor 230, slack sensor 220 and operator force sensor 340.

In accordance with another detailed embodiment of the invention, signal processor 410 comprises a micro processor 205, an output port 215 to generate amplifier command signal 195 and an input port 255 to read signals from upper limit sensor 290, lower limit sensor 230, slack sensor 220, operator force sensor 340, or any combination thereof. Input port 255 comprises any device or combination of devices capable of performing the indicated function including, without limitation, analog-to-digital converter ports, digital input ports, counter ports, and quadrature counter ports. Output port 215 comprises any device or combination of devices capable of performing the indicated function including, without limitation, digital-to-analog converter ports, Pulse Width Modulation (PWM) signal ports, and digital output ports.

In a more detailed embodiment of the invention, power system 420 comprises a power amplifier 450. In operation power amplifier 450 generates actuator command 345 from amplifier command signal 195.

In another more detailed embodiment in accordance with the embodiment of FIG. 19, power amplifier 450 comprises a PWM type amplifier.

In some embodiments, power system 420 comprises an input filter 430 to filter a raw supply voltage to produce a filtered supply voltage.

In another more detailed embodiment in accordance with the embodiment of FIG. 24, the raw supply voltage is provided from a vehicle battery.

In another more detailed embodiment in accordance with the embodiment of FIG. 24, the raw supply voltage is about 12 volts.

In another more detailed embodiment in accordance with the embodiment of FIG. 24, the raw supply voltage is greater than 12 volts.

In some embodiments, power system 420 comprises a voltage regulator 440 to produce a regulated voltage suitable for powering various sensors.

In another more detailed embodiment in accordance with the embodiment of FIG. 24, input filter 430 comprises an input filter capacitor 460 having a capacitance of about 10 microfarads, and voltage regulator 440 comprises an output filter capacitor 460 having a capacitance of about 10 microfarads.

In another more detailed embodiment in accordance with the embodiment of FIG. 24, controller 170 comprises an internal current feedback controller for motor 190.

In another more detailed embodiment in accordance with the embodiment of FIG. 24, controller 170 comprises an internal velocity feedback controller for motor 190.

Figure 25:
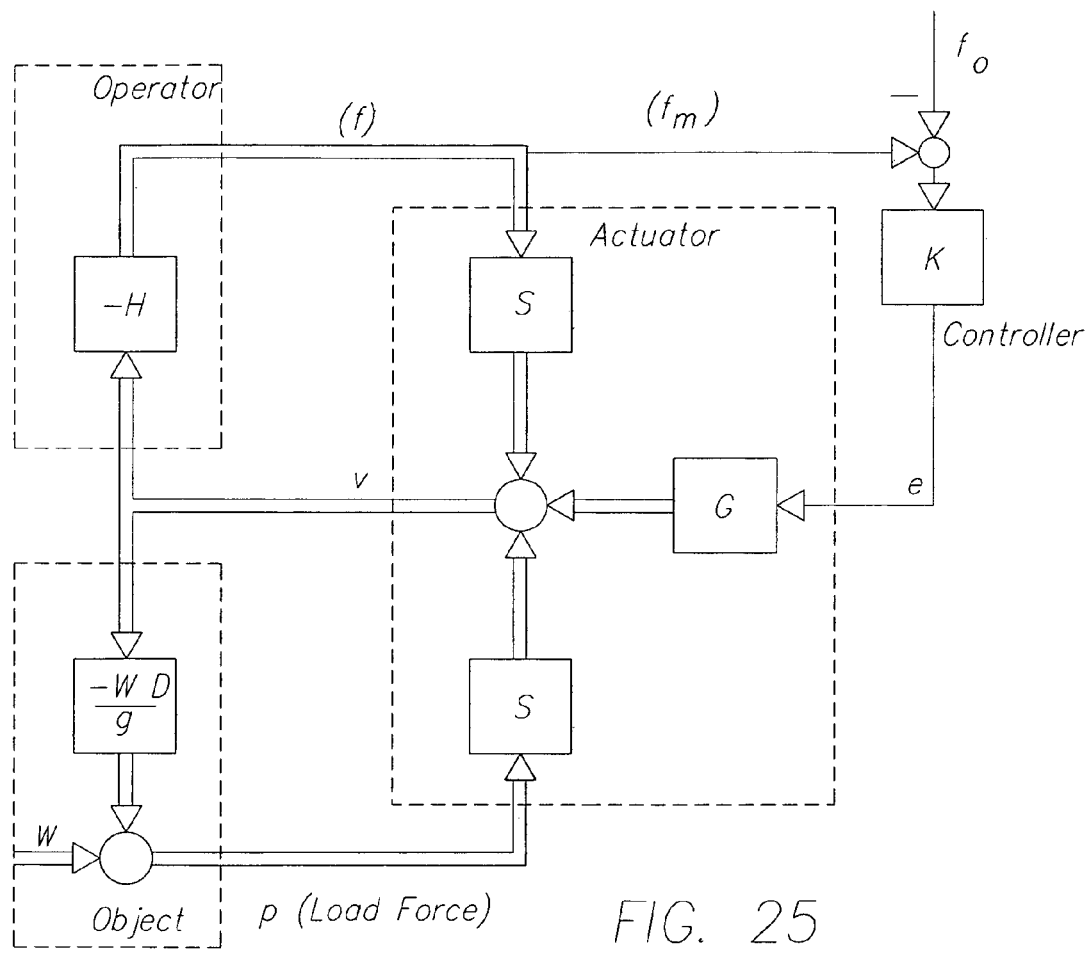
FIG. 25 is a schematic of an embodiment of the block diagram of the invention.

FIG. 25 is an embodiment of the control block diagram of the invention. Amplifier command signal 195 is represented by (e) where positive values for (e) indicate lowering end-effector 160 and that negative values for (e) indicate lifting the end-effector 160. Also assume that a zero value for (e) indicates zero speed for end-effector 160. The linear velocity of end-effector 160 is represented by (v). If the line tensile force is denoted by ($f_R$), then equation (1) represents the speed of end-effector 160 as a function of (e) and the line tensile force, ($f_R$).

$$V = G \times e + S \times f_R \qquad (1)$$

where (G) is the actuator transfer function that relates the amplifier command signal, (e), to the end-effector speed, (v). A positive value for (v) means a downward speed of end-effector 160. (S) is the actuator sensitivity transfer function which relates the line tensile force ($f_R$) to the end-effector velocity (v). If a closed loop velocity controller is designed for the actuator such that (S) is small, the actuator has only a small response to the line tensile force. The line tensile force, ($f_R$), can be represented by equation (2):

$$f_R = f + p \qquad (2)$$

where (f) is the operator-applied force on end-effector 160 and force (p) is imposed by object 110 and end-effector 160, referred to herein as the "load force" on line 140. Positive values for (f) and (p) represent downward forces. Note that (p) is force imposed on line 140 and is equal to the weight and inertia force of object 110 and end-effector 160 taken together as expressed by equation (3).

$$p = W - \frac{W}{g} \frac{d}{dt} v \qquad (3)$$

where W is the weight of the end-effector and the object taken together as a whole and $$\left( \frac{d}{dt} v \right)$$

is the end-effector acceleration. (f) is a function of the operator dynamics represented by H in FIG. 25. The human dynamics, (H), varies from person to person and it also within a person as a function of time and posture. Variable D, in FIG. 25, is the Laplace operator.

The operator force on the end-effector, (f), is measured and is denoted as ($f_m$) in signal processor 410. If slack sensor 220 is not indicating any slack in line 140, and lower limit sensor 230 and upper limit sensor 290 are indicating that end-effector is not at its prescribed lower limit and upper limit positions, then it is reasonable to assign amplifier command signal 195 to be:

$$e = K \times (f_m - f_o) \qquad (4)$$

where (K) is a controller transfer function and ($f_o$) is a biased variable to calibrate the measurement of operator force sensor 340. In general, the magnitude and sign of ($f_m$) depend on many factors including the sensor and the data acquisition gains; ($f_o$) is used in equation (3) to deal with these factors. Substituting for ($f_R$) and (e) from equations (2) and (4) into equation (1) results in the following equation for the end-effector velocity (v):

$$v = K \times (f_m - f_o) + S \times (f + p) \qquad (5)$$

Equation 5 demonstrates that the operator force, (f), and the measurement of the operator force, ($f_m$), contribute to the velocity of end-effector 160. In this way, end-effector 160 follows human arm motions. One can arrive at appropriate values for ($f_o$) and (K) so stable and safe desired maximum upward and downward speeds for the end-effector are achieved.

Assume a situation where end-effector of embodiment of FIG. 17 or FIG. 18 is used where only operator downward force can be measured. In this case ($f_o$) may be set to a value such that when the operator leaves the handle (i.e. $f_m = 0$), the end-effector moves upwardly with the desired maximum speed of $v_{up}$.

$$v_{up} = K \times (-f_o) + S \times p \qquad (6)$$

When the operator pushes downwardly, the desired maximum end-effector speed will be $$v_{down} = K \times (f_m - f_o) + S \times (f + p) \qquad (7)$$

Using equations (6) and (7) and choosing comfortable and safe desired maximum upward and downward speeds for the end-effector, one can arrive at appropriate values for ($f_o$) and (K).

The choice of controller (K), must not only yield the desired performance, but also stabilize the closed loop system of FIG. 25. Linear system theory is employed here to disclose the system properties; however, one can also use nonlinear models and follow the mathematical procedure described above to describe the system dynamic behavior and design controllers.

Depending on the state of lower limit sensor 230, upper limit sensor 290 and slack sensor 220, the amplifier command signal, (e), may take on values different from what equation (4) prescribes. In accordance with a more detailed embodiment of the invention, FIG. 26 shows an embodiment of the control logic if end-effector of embodiment of FIG. 17 or FIG. 18 (measuring downward forces only) is employed. With proper choice of ($f_o$) and (K) in equation (3), (e) can be produced such that when the operator has left the handle, end-effector 160 moves upwardly at an appropriate speed. In this embodiment, as the operator pushes downwardly on handle, the upward end-effector speed becomes smaller. As the operator continues to further push downwardly, at some position of the handle, the pulley and consequently, the end-effector, come to zero speed. When the operator continues to push further on the handle, the end-effector will change its direction of motion and will start to move downwardly. When the operator leaves the handle, the handle moves quickly upwardly by the force of compression spring 365, with end-effector 160 moving upwardly until the upper limit sensor is pressed.

In accordance with a more detailed embodiment of the embodiment of FIG. 26, controller 170 implements a method wherein end-effector 160 is stopped when upper limit sensor 290 is activated and the operator force measurement generated by operator force sensor 340 does not indicate an operator intention for lowering end-effector 160.

In accordance with a more detailed embodiment of the embodiment of FIG. 26, controller 170 implements a method wherein end-effector 160 is stopped when lower limit sensor 230 is activated and the operator force measurement generated by operator force sensor 340 does not indicate an operator intention for raising end-effector 160.

In accordance with a more detailed embodiment of the embodiment of FIG. 26, controller 170 implements a method wherein end-effector 160 is stopped when slack sensor 220 is activated and the operator force measurement generated by operator force sensor 340 does not indicate an operator intention for raising end-effector 160.

The embodiment of FIG. 26 teaches the practitioners an embodiment in creating intelligent and safe behavior for the system using signals described here. One can arrive at a variety of behaviors for the system as a function of various signals. Additionally one can also use other switches and sensors to create a more complex behavior for the system.

In accordance with another embodiment of the present invention, FIG. 1 illustrates apparatus 100 further comprising a holding system 180. In operation, holding system 180 holds trunk lid 130 in an open position against at least a portion of the tensile force in line 140.

Figure 27:
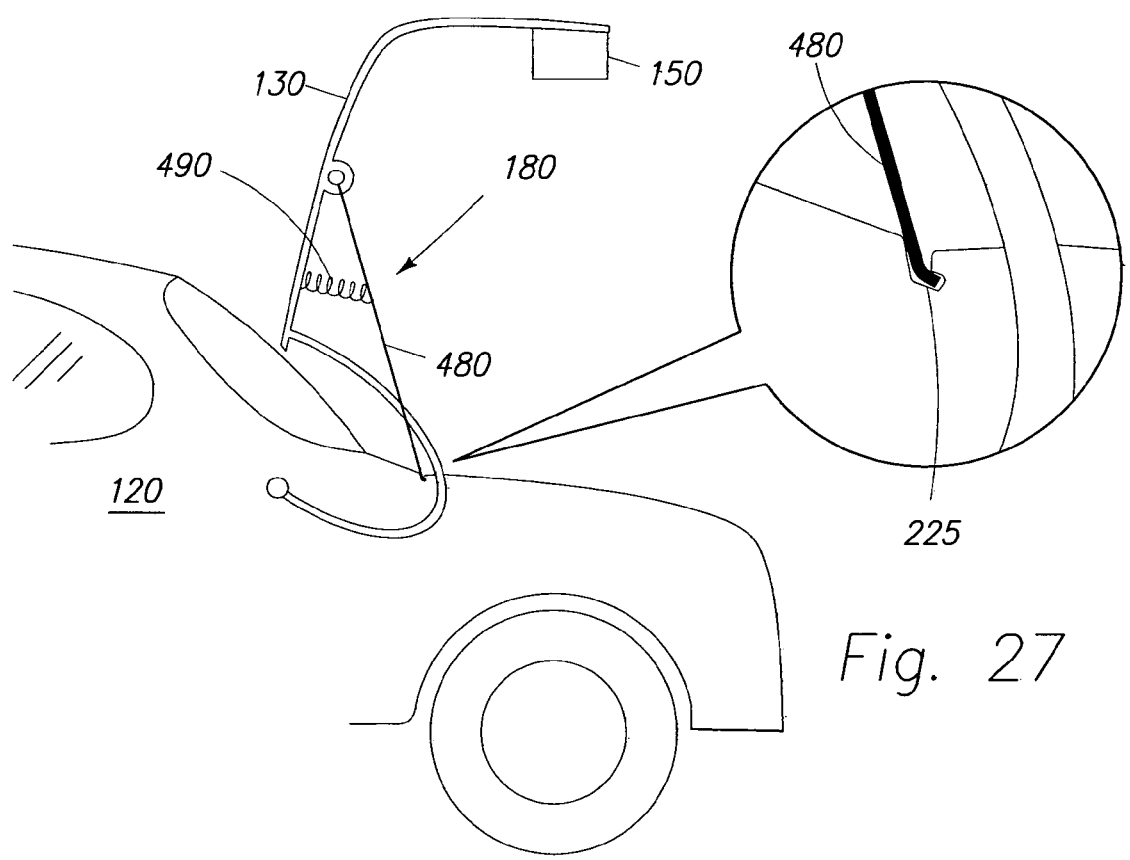
FIG. 27 is an orthographic drawing in accordance with another embodiment of the present invention.

In accordance with another embodiment of the present invention, FIG. 27 is an orthographic drawing wherein holding system 180 comprises a holding bar 480. A first end of holding bar 480 is rotatably coupled to trunk lid 130. In operation, a second end of holding bar 480 is inserted into a receptacle 225 in vehicle 120.

In accordance with another embodiment, holding system 180 further comprises a storage spring 490 disposed between holding bar 480 and trunk lid 130. Storage spring 490 holds holding bar 480 in a stored position when holding bar 480 is not in use.

Figure 28:
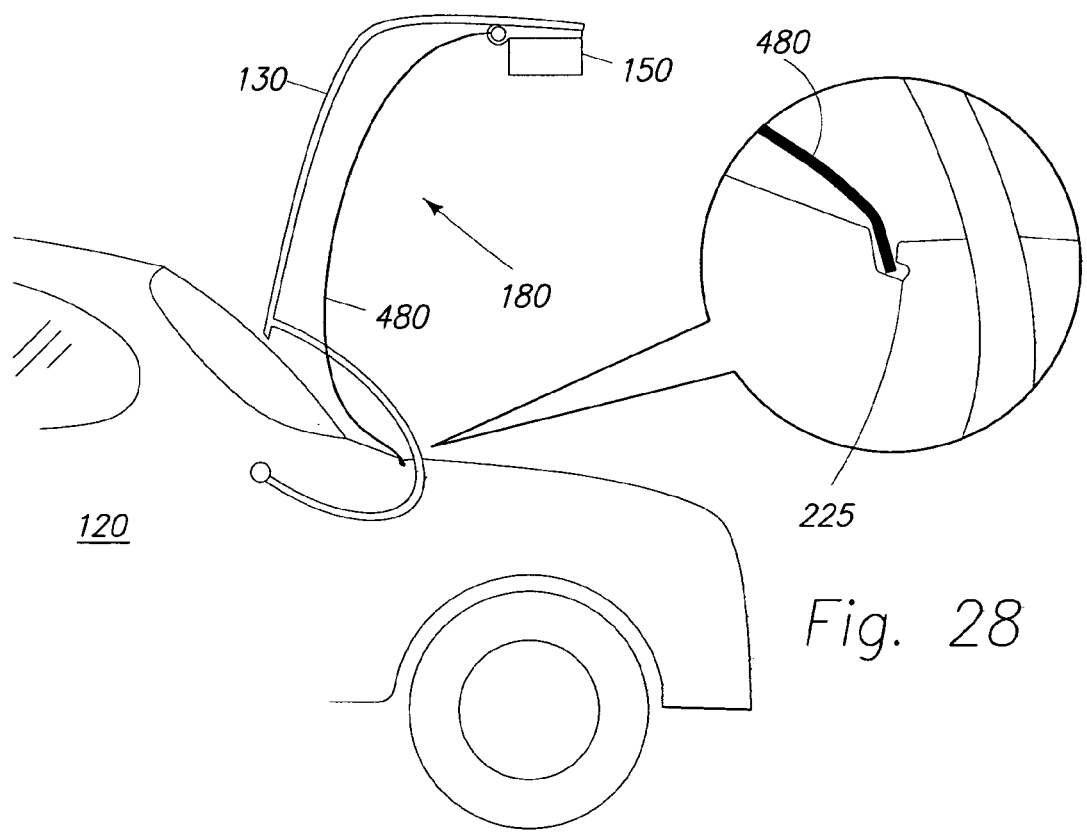
FIG. 28 is an orthographic drawing in accordance with a more detailed embodiment of the embodiment of FIG. 27.

FIG. 28 is an orthographic drawing in accordance with a more detailed embodiment of the embodiment of FIG. 27. In this embodiment, holding system 180 comprises a holding bar 480 having a first end rotatably coupled to actuator 150. In operation, a second end of holding bar 480 is inserted into a receptacle 225 in vehicle 120.

Figure 29:
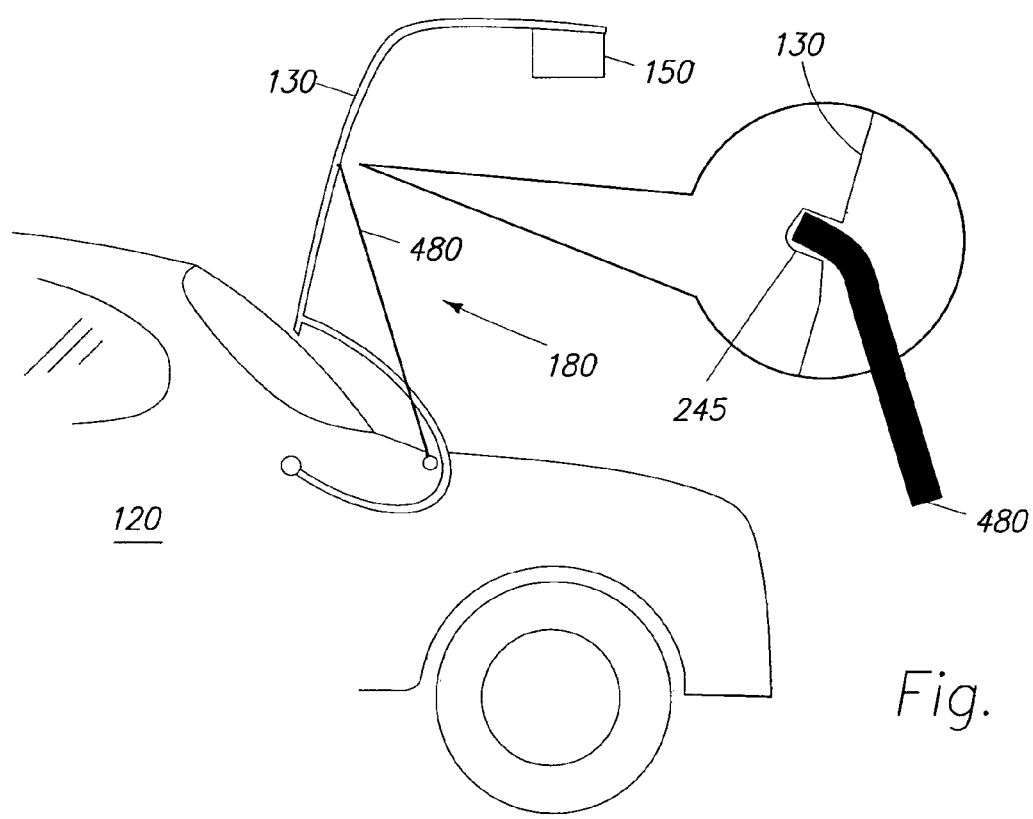
FIG. 29 is an orthographic drawing in accordance with another more detailed embodiment of the embodiment of FIG. 27.

In accordance with another more detailed embodiment of the embodiment of FIG. 27, FIG. 29 is an orthographic drawing wherein holding system 180 comprises a holding bar 480 having a first end rotatably coupled to vehicle 120. In operation, a second end of holding bar 480 is inserted into a receptacle 245 in trunk lid 130.

Figure 30:
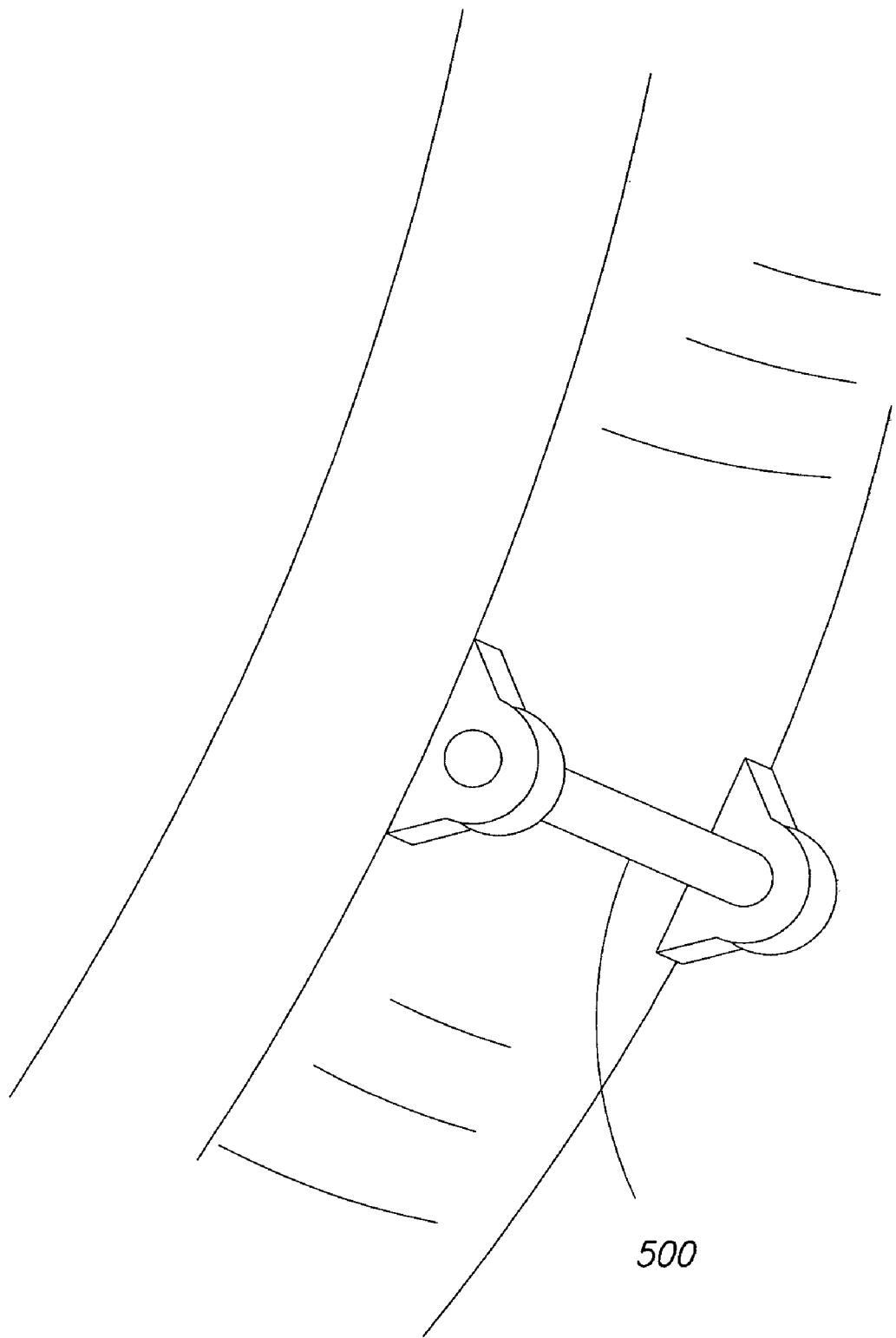
FIG. 30 is a perspective drawing in accordance with another more detailed embodiment of the embodiment of FIG. 27.
Figure 31:
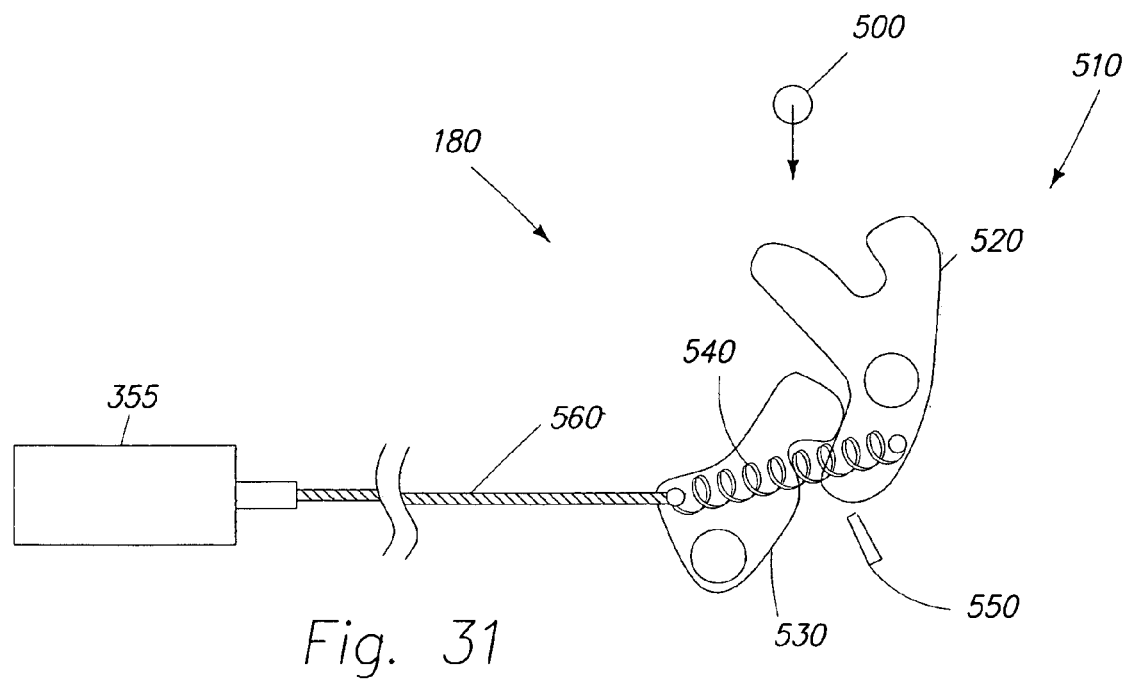
FIG. 31 is an orthographic drawing in accordance with another more detailed embodiment of the embodiment of FIG. 27.
Figure 32:
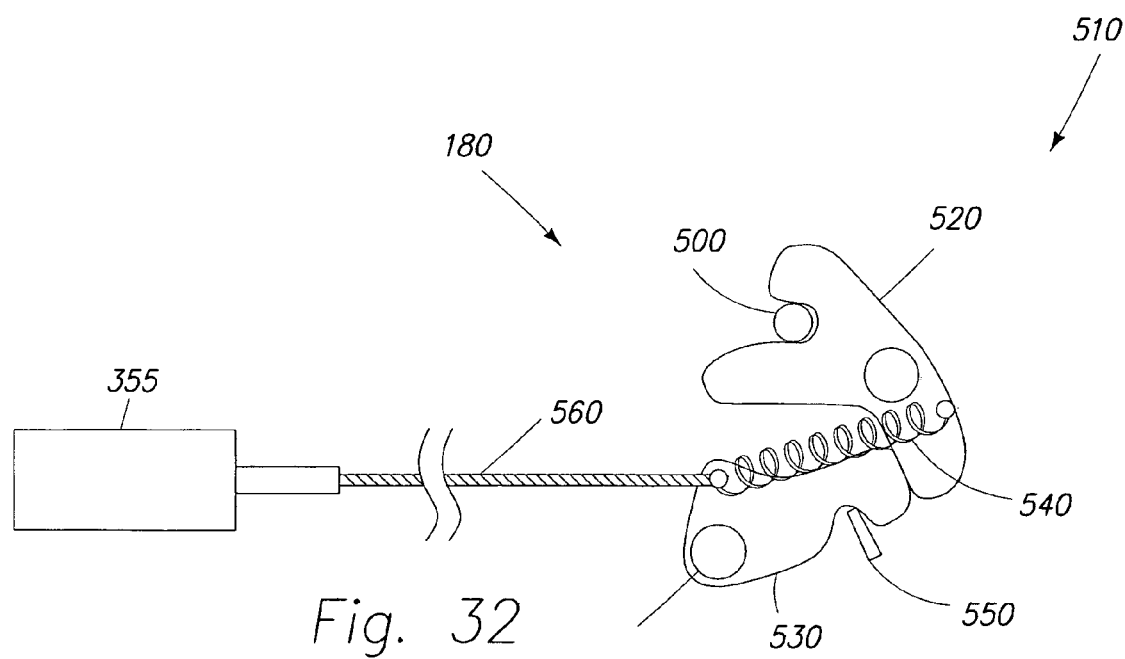
FIG. 32 is an orthographic drawing in accordance with another configuration of the embodiment of FIG. 31.

In accordance with another more detailed embodiment of the present invention, FIG. 31 is an orthographic drawing wherein holding system 180 comprises a locking bracket 500 and a locking mechanism 510. Locking bracket 500 is mechanically coupled to trunk lid 130 (see FIG. 30 for an example for placement of locking bracket 500 on a support portion of trunk lid 130). Locking mechanism 510 is mechanically coupled to vehicle 120 and, in operation, receives and locks locking bracket 500 automatically when trunk lid 130 reaches an open position as shown in FIG. 32.

In accordance with another embodiment of the invention, locking bracket 500 is mechanically coupled to vehicle 120 and locking mechanism 510 is mechanically coupled to trunk lid 130.

Locking bracket 500 comprises any device or combination of devices capable of performing the indicated functions. Examples of locking bracket 500 include, without limitation, pins, dowel pins, cylindrical rods, metallic brackets, and combinations thereof.

In a more detailed embodiment in accordance with the embodiment of FIG. 30, locking mechanism 510 comprises a first link 520, a second link 530, a linkage spring 540, a linkage stop 550, and a release member 560. First link 520 is rotatably coupled to vehicle 120 and, in operation, holds and releases locking bracket 500. Second link 530 is rotatably coupled to vehicle 120 and slides against first link 520 while linkage spring 540 develops a bias force between first link 520 and second link 530. Linkage stop 550 is mechanically coupled to vehicle 120 and prevents rotation of second link 530 when second link 530 is in a locked position. To release locking bracket 500, release member 560 applies a release torque to second link 530. FIG. 31 shows locking mechanism 510 in an unlocked position; FIG. 32 shows locking mechanism 510 in the locked position. When trunk lid 130 is moved to an open position, locking mechanism 510 receives and automatically locks locking bracket 500 preventing trunk lid 130 from moving.

In accordance with another embodiment of the present invention, holding system 180 further comprises a release actuator 355. In operation, release actuator 355 releases locking bracket 500 when activated enabling trunk lid 130 to move out of the open position. Release actuator 355 comprises any device or combination of devices capable of performing the indicated functions. Examples of release actuator 355 include, without limitation, solenoids, linear motors, rotary motors, and combinations thereof.

Figure 33:
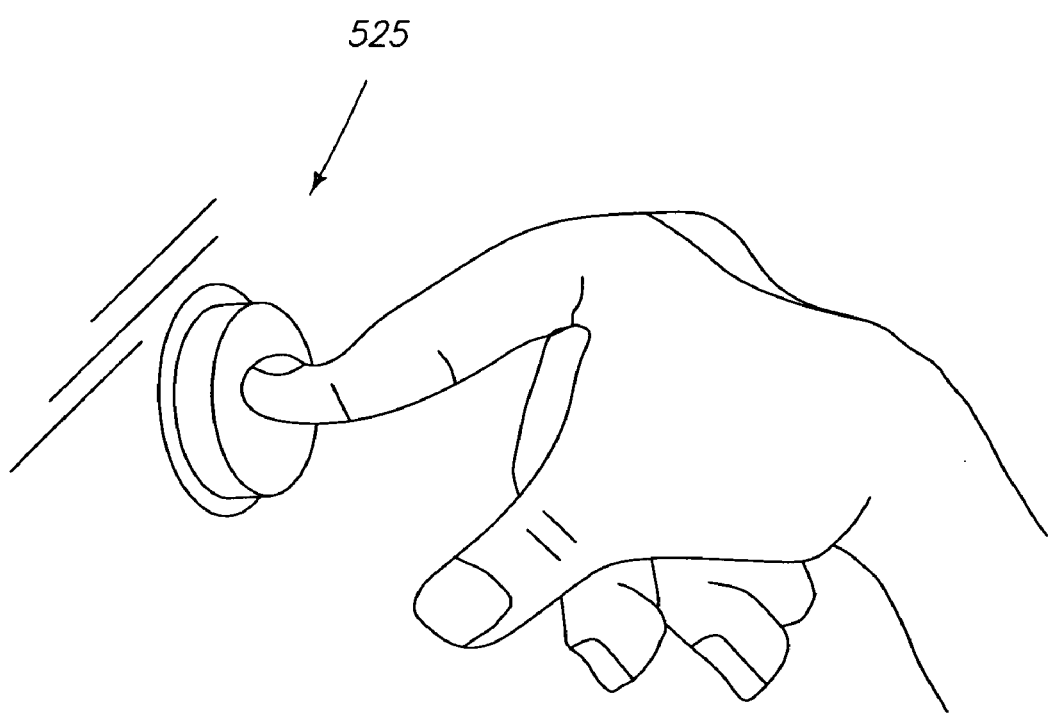
FIG. 33 is a perspective drawing in accordance with another more detailed embodiment of the embodiment of FIG. 31.

In accordance with another embodiment of the present invention, holding system 180 further comprises an operator release device 525 (FIG. 33). In operation, operator release device 525 issues an operator release signal when activated by the operator. Operator release device 525 is disposed at any point on trunk lid 130 or vehicle body and comprises any device or combination of devices capable of performing the indicated functions. Examples of operator release device include, without limitation, push buttons, pull buttons, pull handles, levers, buttons, keys, switches and knobs.

In accordance with another embodiment of the present invention, release actuator 355 releases locking bracket 500 enabling trunk lid 130 to move out of the open position when the operator activates operator release device 525.

In accordance with another embodiment of the present invention, slack signal from slack sensor 220 is also used to control release actuator 355. In operation release actuator 355 releases locking bracket 500 and therefore trunk lid 130 will be released to move out of the open position when operator release device 525 is activated and slack sensor 220 indicates there is no object on end-effector 160.

In accordance with another embodiment of the present invention, the upper limit signal from upper limit sensor 290 is also used to control release actuator 355. Release actuator 355 releases locking bracket 500 enabling trunk lid 130 to move out of the open position when operator release device 525 is activated, slack sensor 220 indicates that there is no object on end-effector 160, and upper limit sensor 290 indicates end-effector 160 has reached the prescribed upper limit position.

Practitioners are encouraged to ensure various safety systems are in place. In accordance with another embodiment of the holding system, holding system 180 comprises a lid position sensor to sense the status of trunk lid 130. Apparatus 100 is inhibited (i.e., the end-effector is prevented from moving) if the lid position sensor detects that trunk lid 130 is not in its open position.

Figure 34:
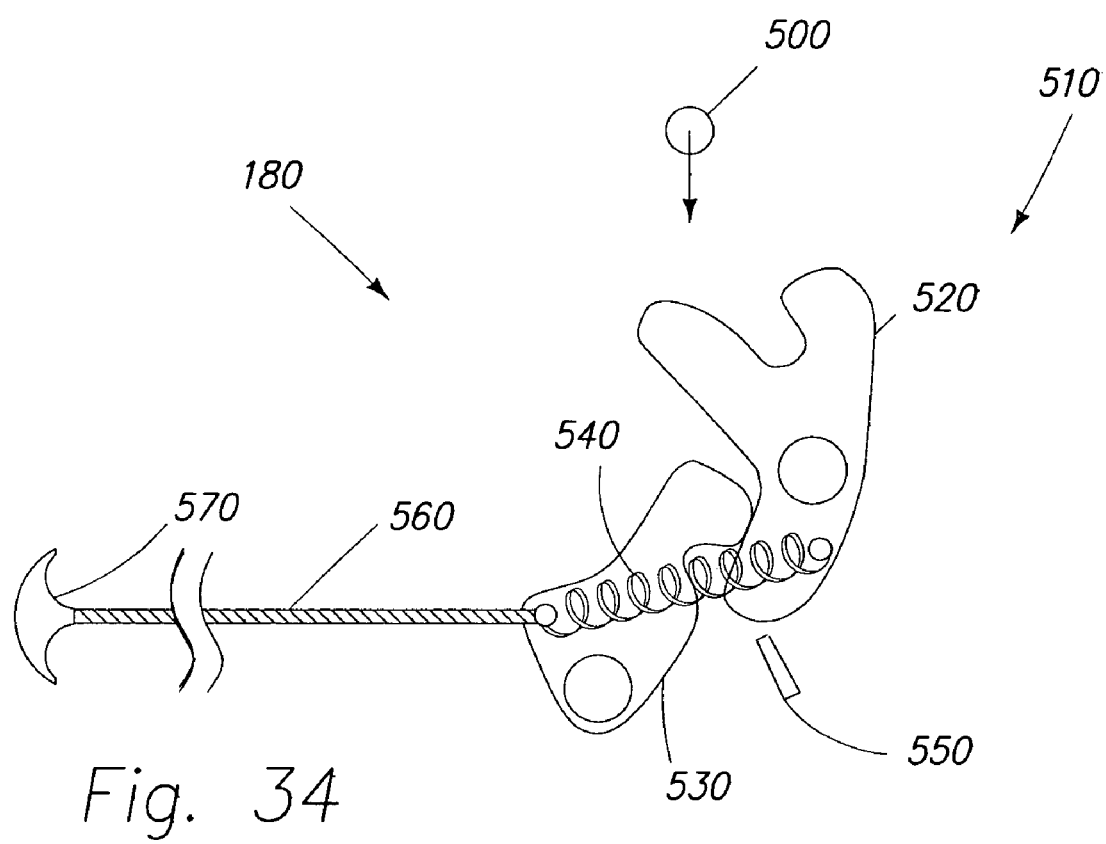
FIG. 34 is an orthographic drawing in accordance with a more detailed embodiment of the embodiment of FIG. 31.

In accordance with another embodiment of the present invention, FIG. 34 shows holding system 180 further comprising a pull handle 570. In operation, pull handle 570 couples an operator release force to locking mechanism 510.

Figure 35:
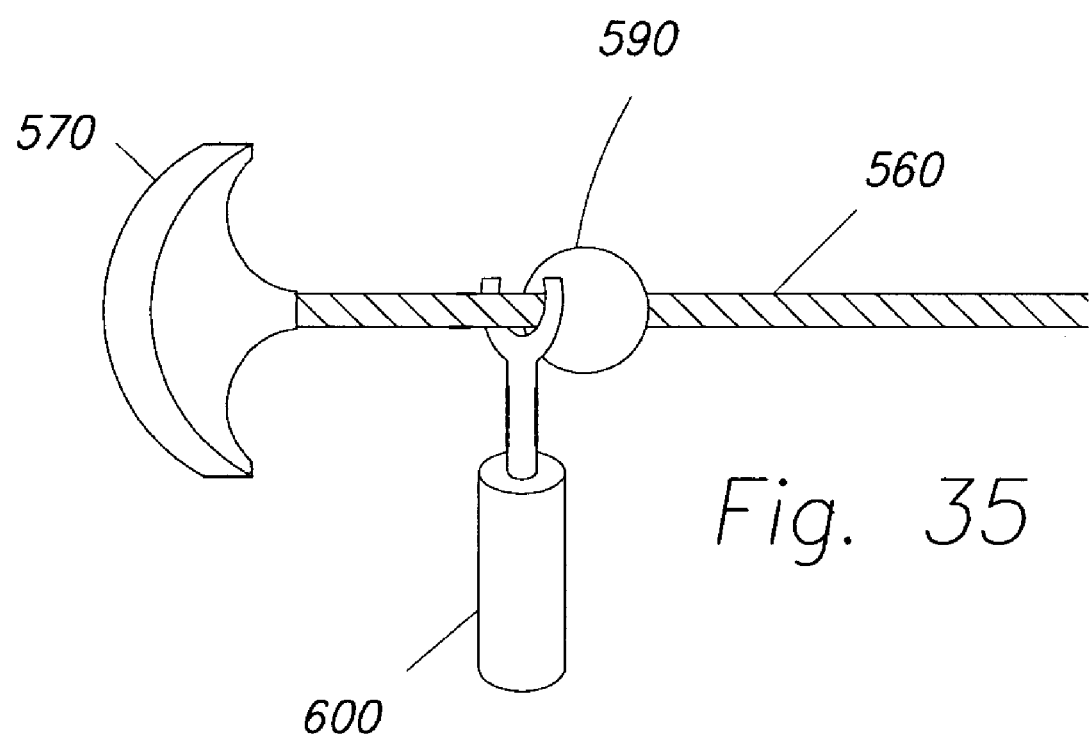
FIG. 35 is an orthographic drawing in accordance with another more detailed embodiment of the embodiment of FIG. 31.

In accordance with a more detailed embodiment of the invention, FIG. 35 shows holding system 180 further comprises a release stopper 590 and an interlock solenoid 600. Release stopper 590 is mechanically coupled to locking mechanism 510. In operation, interlock solenoid 600 prevents motion of release stopper 590 in response to an interlock solenoid command.

Figure 36:
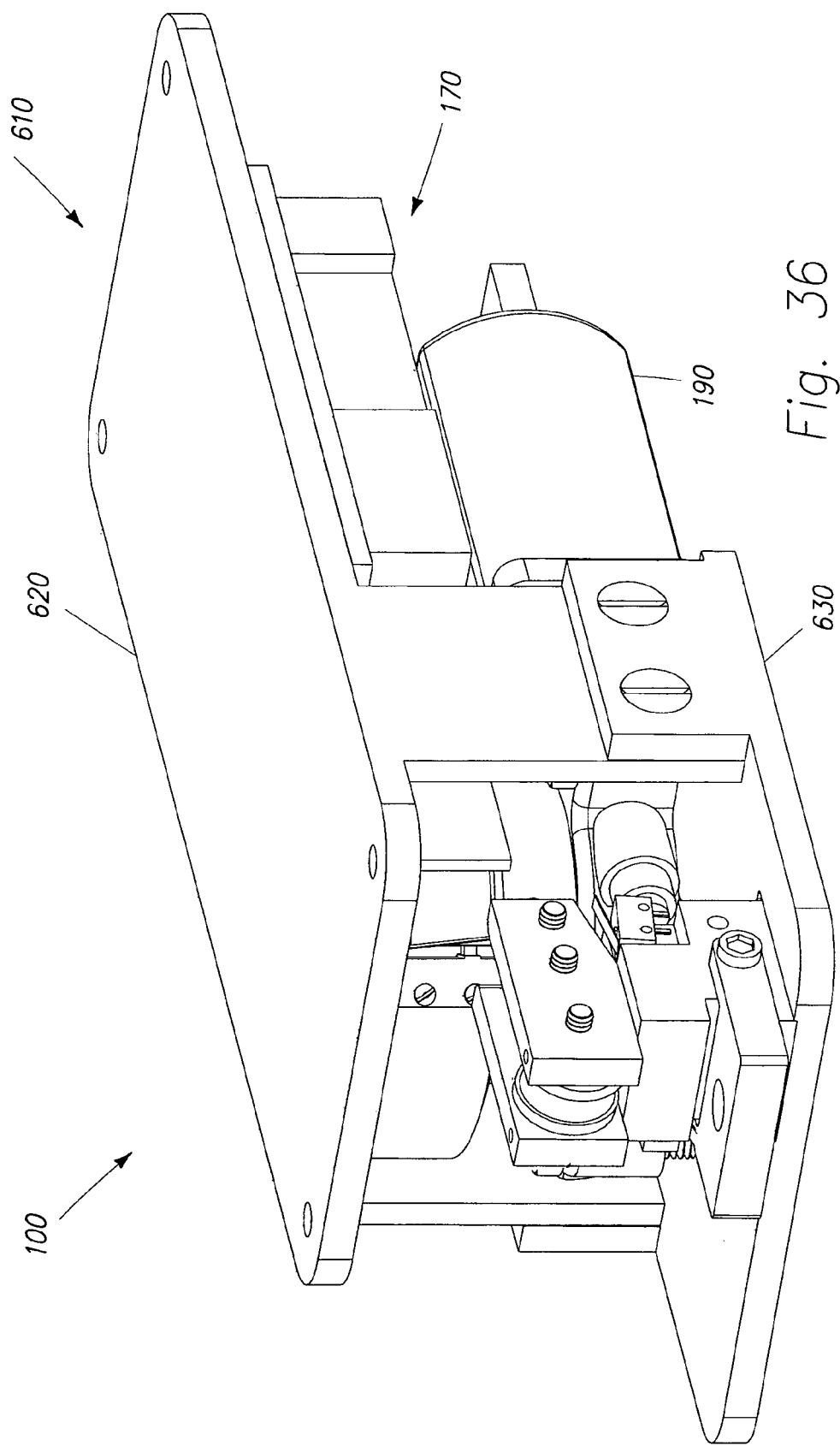
FIG. 36 is a perspective drawing in accordance with another embodiment of the present invention.

In accordance with another embodiment of the present invention, FIG. 36 is a perspective drawing wherein actuator 150 further comprises a mounting frame 610 connectable to trunk lid 130 and for transmitting at least a portion of the tensile force in line 140 to trunk lid 130. In this embodiment, actuator 150 and controller 170 are mechanically coupled to mounting frame 610.

Figure 37:
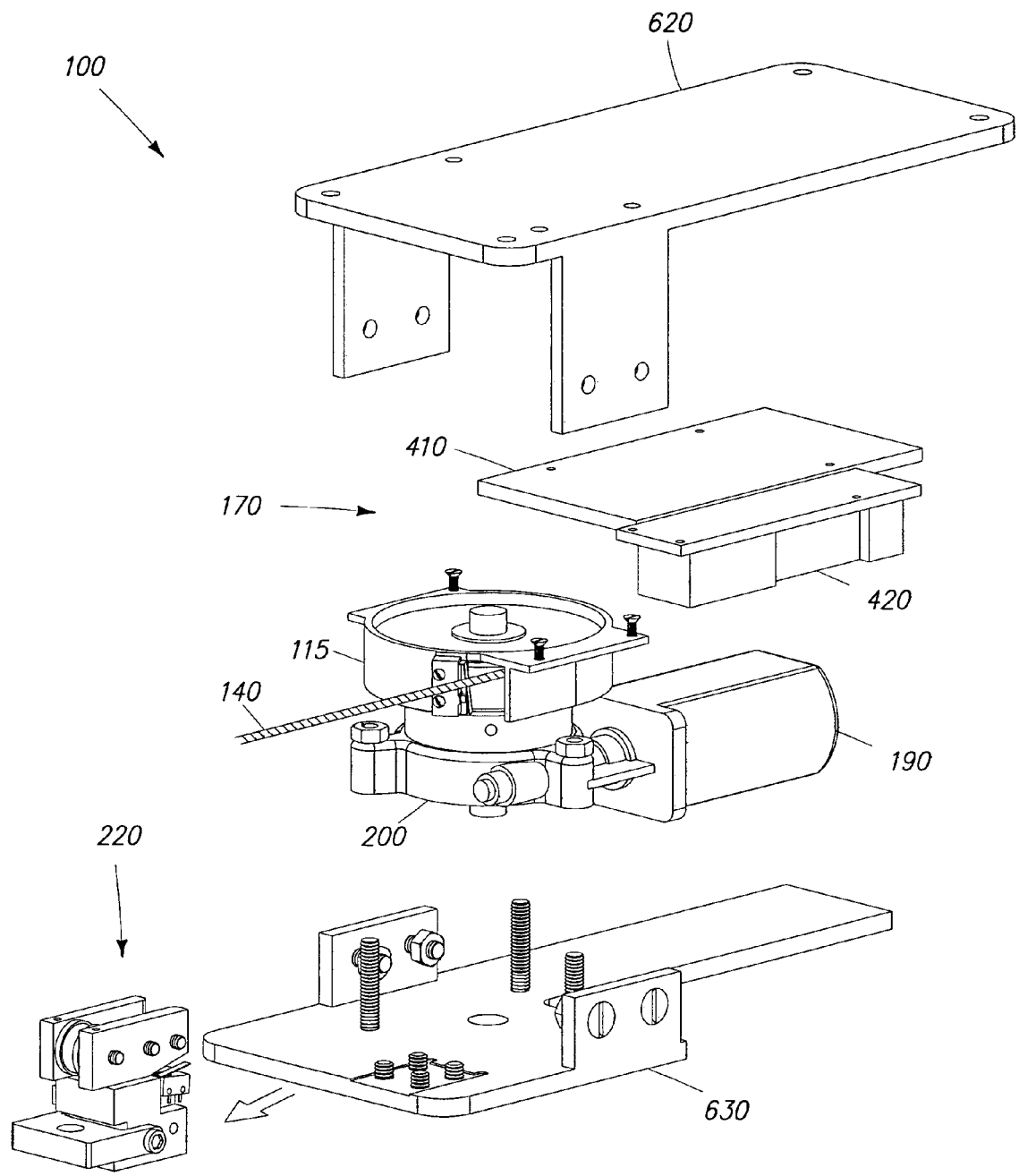
FIG. 37 is an exploded perspective drawing in accordance with a more detailed embodiment of the embodiment of FIG. 36.

In accordance with a more detailed embodiment of the embodiment of FIG. 36, FIG. 37 is an exploded perspective drawing wherein mounting frame 610 comprises an upper mounting frame 620 and a lower mounting frame 630. Lower mounting frame 630 is mechanically coupled to upper mounting frame 620.

Figure 38:
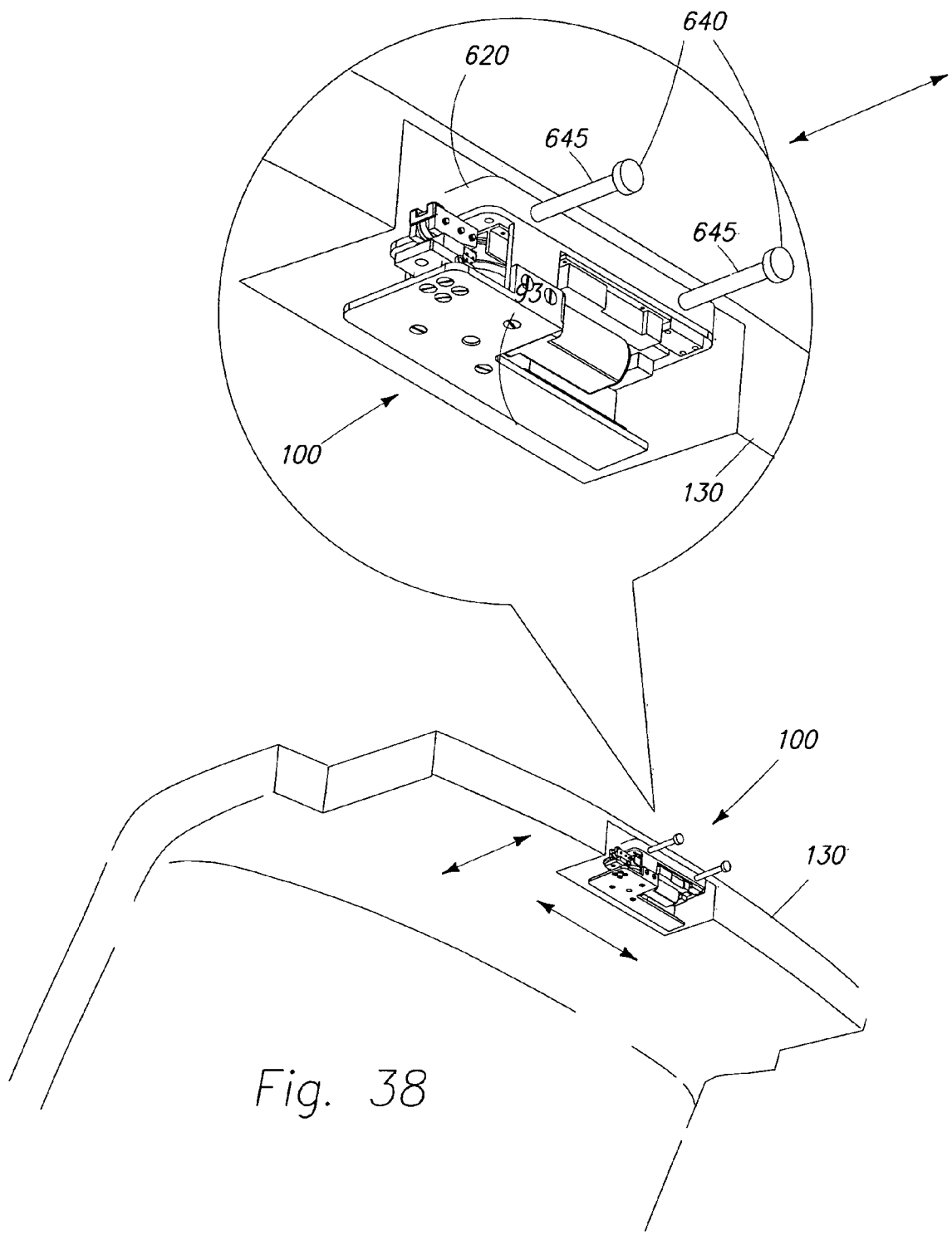
FIG. 38 is a perspective drawing in accordance with another more detailed embodiment of the embodiment of FIG. 36.

In accordance with another more detailed embodiment of the embodiment of FIG. 36, FIG. 38 is a perspective drawing wherein mounting frame 610 comprises at least one motion guide 640. In operation, motion guide 640 guides the motion of mounting frame 610 with respect to trunk lid 130. In some application, manipulation of object 110 is facilitated by being able to move actuator 150 to alternative locations. In some embodiments, additional motion guides 640 guide motion of actuator 150 in a variety of straight and curvy paths.

In a more detailed embodiment in accordance with the embodiment of FIG. 38, motion guide 640 comprises rod bearings 645.

Figure 39:
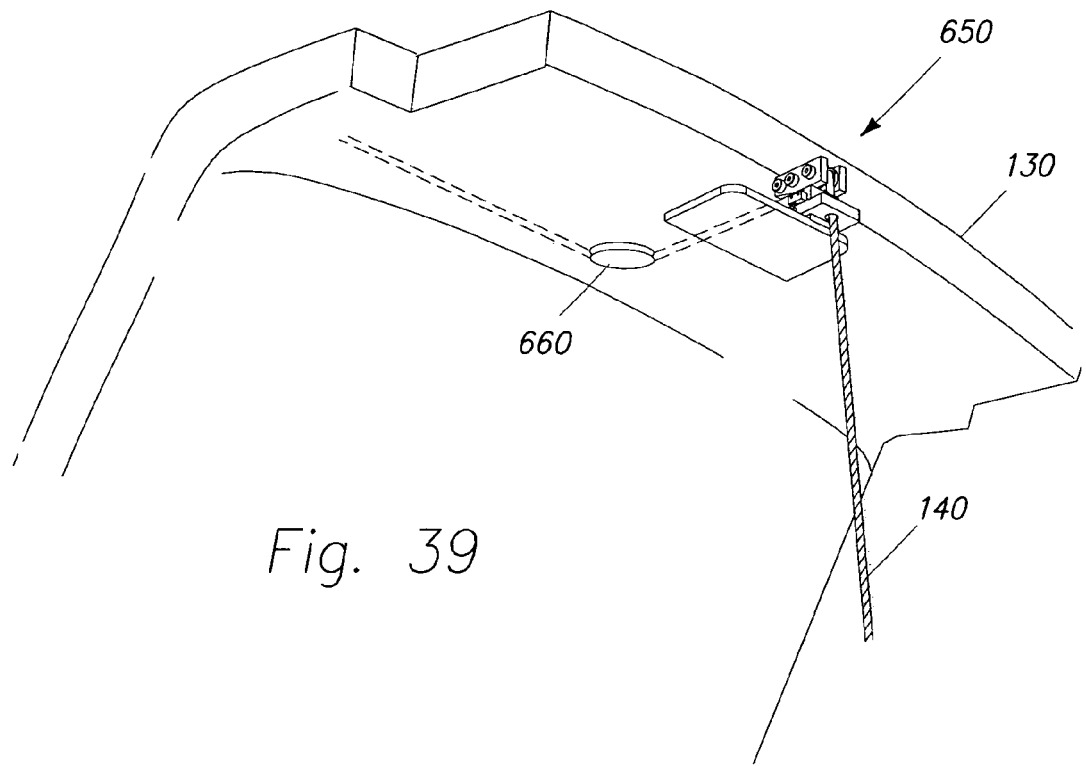
FIG. 39 is a perspective drawing in accordance with another more detailed embodiment of the embodiment of FIG. 1.

In accordance with another more detailed embodiment of the embodiment of FIG. 1, FIG. 39 is a perspective drawing wherein actuator 150 comprises a line routing system 650. In operation, line routing system 650 routes line 140 along trunk lid 130.

In accordance with a more detailed embodiment of the embodiment of FIG. 39, line routing system 650 comprises a routing pulley 660.

While only certain features of the invention have been illustrated and described herein, many modifications and changes will occur to those skilled in the art. For example, in an embodiment actuator 150 applies a force to end-effector 160 via a mechanism (e.g., linkages, joints or sliders) in response to an actuator command, and is disposed so as to transmit at least a portion of the force to trunk lid 130. End-effector 160 is mechanically coupled to actuator 150 and transmits the force and an operator force to object 110 and also generates an operator force measurement. It is, therefore, to be understood that the appended claims are intended to cover all such modifications and changes as fall within the true spirit of the invention.

The invention claimed is:

1. An apparatus for loading an object into a vehicle, said vehicle having a trunk lid, said apparatus comprising:
    a line;
    an actuator coupled to said vehicle and adapted for applying a tensile force to said line in response to an actuator command, and disposed and adapted for transmitting at least a portion of said tensile force to said trunk lid;
    a holding system adapted for holding said trunk lid in an open position against said at least a portion of said tensile force when said trunk lid reaches said open position;
    an end-effector mechanically coupled to said line and adapted for transmitting said tensile force and an operator force to said object and for generating an operator force measurement; and
    a controller adapted for generating said actuator command from said operator force measurement wherein end-effector automatically moves upwardly when said operator is not imposing any downward vertical force on said end-effector and said end-effector moves as a function of said operator force measurement when said operator is imposing a downward vertical force on said end-effector.

2. The apparatus of claim 1 wherein said line comprises an element or combination of elements selected from a group consisting of rope, wire, cable, belts, synthetic rope, fabric rope, plastic rope, wire rope, cord, twine, chain, bicycle-type chain, and string.

3. The apparatus of claim 1 wherein said line comprises a multi-strand rope having a maximum strength greater than 300 pounds.

4. The apparatus of claim 1 wherein said end-effector is adapted for wirelessly transmitting said operator force measurement to controller.

5. The apparatus of claim 1 wherein said actuator comprises:
    a motor adapted for generating a motor torque in response to said actuator command; and
    a take-up pulley adapted for receiving said motor torque and applying a tensile force to said line.

6. The apparatus of claim 5 wherein said motor comprises an element or combination of elements selected from a group consisting of electric motors, hydraulic motors, and pneumatic motors.

7. The apparatus of claim 5 wherein said take-up pulley comprises an element or combination of elements selected from a group consisting of drums, winches, single-groove pulleys, and multi-groove pulleys.

8. The apparatus of claim 5 further comprising a transmission mechanically coupled between said motor and said take-up pulley.

9. The apparatus of claim 8 wherein said transmission comprises an element or combination of elements selected from a group consisting of gear trains, worm gears, bevel gears, planetary gears, pulleys, lines, belts, toothed belts, toothed pulleys, and harmonic drives.

10. The apparatus of claim 1 wherein said actuator further comprises a lower limit sensor adapted for generating a lower limit signal when said end-effector reaches a prescribed lower limit position, said controller being father adapted for generating said actuator command from said lower limit signal.

11. The apparatus of claim 10 wherein said lower limit sensor comprises an element or combination of elements selected from a group consisting of switches and sensors or pick-ups capable of sensing the proximity of said line by magnetic, electrical, or optical means or combinations thereof.

12. The apparatus of claim 10 wherein said lower limit sensor comprises a limit switch.

13. The apparatus of claim 1 wherein said actuator further comprises a slack sensor adapted for generating a slack signal when said line becomes slack and, optionally, for redirecting line, said controller being further adapted for generating said actuator command from said slack signal.

14. The apparatus of claim 13 wherein said slack sensor further comprises:
    a base block;
    an upper assembly rotatably coupled to said base block and adapted for rotating with respect to said base block as a function of line tension in said line;
    a line guide rotatably coupled to said upper assembly and adapted for redirecting line;
    a bias spring mechanically coupled between said upper assembly and said base block and adapted for exerting a bias force on said upper assembly; and a load sensor adapted for generating said slack signal when said line tension is insufficient to overcome said bias force.

15. The apparatus of claim 14 wherein said load sensor is mechanically coupled to said upper assembly.

16. The apparatus of claim 14 wherein said load sensor is mechanically coupled to said base block.

17. The apparatus of claim 14 wherein said load sensor comprises a limit switch.

18. The apparatus of claim 14 wherein said load sensor comprises an element or combination of elements selected from a group consisting of switches and sensors or pick-ups capable of sensing the proximity of upper assembly to base block by magnetic, electrical, or optical means or combinations thereof.

19. The apparatus of claim 14 wherein said line guide comprises an element or combination of elements selected from a group consisting of pulleys, sprockets, dowels, sleeves, and channels.

20. The apparatus of claim 1 wherein said actuator further comprises an upper limit sensor adapted for generating an upper limit signal when said end-effector reaches a prescribed upper limit position, said controller being further adapted for generating said actuator command from said upper limit signal.

21. The apparatus of claim 20 wherein said upper limit sensor further comprises:
an upper limit marker mechanically coupled to said line; and
a marker detector adapted for generating said upper limit signal when said upper limit marker reaches said prescribed upper limit position.

22. The apparatus of claim 21 wherein said upper limit marker comprises a rubber object.

23. The apparatus of claim 21 wherein said marker detector comprises an element or combination of elements selected from a group consisting of switches and sensors or pick-ups capable of sensing the proximity of said upper limit marker by magnetic, electrical, or optical means or combinations thereof.

24. The apparatus of claim 21 wherein said marker detector comprises:
an upper limit bracket, said line passing through an opening in said upper limit bracket, said opening being shaped to prevent passage therethrough of said upper limit marker; and
a contact sensor adapted for generating said upper limit signal as a function of a contact force between said upper limit marker and said upper limit bracket.

25. The apparatus of claim 24 wherein:
said marker detector further comprises a base block,
said upper limit bracket being rotatably coupled to said base block; and
said contact sensor comprises a limit switch adapted for generating said upper limit signal when said contact force causes sufficient rotation of said upper limit bracket with respect to said base block.

26. The apparatus of claim 1 wherein said end-effector comprises:
an end-effector frame mechanically coupled to said line;
a cargo interface mechanically coupled to said end-effector frame and adapted for transmitting said tensile force to said object;
an operator force sensor mechanically coupled to said end-effector frame and adapted for generating said operator force measurement; and
a handle mechanically coupled to said operator force sensor and adapted for transmitting said operator force to said operator force sensor.

27. The apparatus of claim 26 wherein said cargo interface comprises an element or combination of elements selected from a group consisting of hooks, suction cups, magnets, and grippers.

28. The apparatus of claim 26 wherein said operator force sensor comprises an element or combination of elements selected from a group consisting of piezoelectric force sensors, metallic strain gage force sensors, semiconductor strain gage force sensors, Wheatstone bridge-deposited strain gage force sensors, and force sensing resistors.

29. The apparatus of claim 26 wherein a longitudinal axis of said handle does not pass through said cargo interface.

30. The apparatus of claim 26 wherein said operator force sensor comprises:
a compliant element disposed between said handle and said end-effector frame; and
a handle displacement sensor adapted for sensing a deformation of said compliant element, said operator force measurement being a function of said deformation.

31. The apparatus of claim 30 wherein said compliant element comprises at least one compression spring.

32. The apparatus of claim 30 wherein said handle displacement sensor comprises an element or combination of elements selected from a group consisting of linear potentiometers, magnetic linear encoders, optical linear encoders, linear variable differential transformers, capacitive displacement sensors, eddy current proximity sensors, variable-inductance proximity sensor, and rocker switches.

33. The apparatus of claim 26 wherein:
said end-effector frame comprises a spline shaft; and
said handle comprises a ball nut adapted for coupling said spline shaft.

34. The apparatus of claim 26 wherein said handle further comprises a handle switch adapted for generating a handle switch signal when said handle is grasped, said controller being further adapted for holding said actuator stationary when said handle switch is not grasped.

35. The apparatus of claim 1 wherein said controller comprises:
a signal processor adapted for generating an amplifier command signal from said operator force measurement; and
a power system adapted for generating said actuator command from said amplifier command signal.

36. The apparatus of claim 35 wherein signal processor comprises an element or combination of elements selected from a group consisting of analog devices; analog computation modules; digital devices including, without limitation, small-, medium-, and large-scale integrated circuits, application specific integrated circuits, programmable gate arrays, and programmable logic arrays; and digital computation modules including, without limitation, microcomputers, microprocessors, microcontrollers, and programmable logic controllers.

37. The apparatus of claim 35 wherein signal processor comprises an element or combination of elements selected from a group consisting of electromechanical relays or MOSFET switches.

38. The apparatus of claim 35 wherein signal processor generates amplifier command signal from any signal or combination of signals generated by upper limit sensor, lower limit sensor, slack sensor and operator force sensor.

39. The apparatus of claim 35 wherein said power system comprises a power amplifier to generate said actuator command from said amplifier command signal.

40. The apparatus of claim 39 wherein said power amplifier is a PWM type amplifier.

41. The apparatus of claim 35 wherein said power system comprises an input filter adapted for filtering a raw supply voltage to produce a filtered supply voltage.

42. The apparatus of claim 41 wherein said raw supply voltage is provided from a vehicle battery.

43. The apparatus of claim 41 wherein said raw supply voltage is about 12 volts.

44. The apparatus of claim 41 wherein said raw supply voltage is greater than 12 volts.

45. The apparatus of claim 10 where said controller implements a method wherein said end-effector is stopped when said lower limit sensor is activated and said operator force measurement generated by said operator force sensor does not indicate an operator intention for raising said end-effector.

46. The apparatus of claim 20 where said controller implements a method wherein said end-effector is stopped when upper limit sensor is activated and the operator force measurement generated by operator force sensor does not indicate an operator intention for lowering end-effector.

47. The apparatus of claim 13 where controller implements a method wherein said end-effector is stopped when slack sensor is activated and the operator force measurement generated by operator force sensor does not indicate an operator intention for raising end-effector.

48. The apparatus of claim 35 wherein said power system comprises a voltage regulator adapted for generating a regulated voltage.

49. The apparatus of claim 1 wherein said holding system comprises a locking bracket; and a locking mechanism adapted for receiving and holding said locking bracket when said trunk lid moves to said open position.

50. The apparatus of claim 49 wherein said locking bracket is mechanically coupled to said trunk lid and said locking mechanism is mechanically coupled to said vehicle.

51. The apparatus of claim 49 wherein said locking mechanism is mechanically coupled to said trunk lid and said locking bracket is mechanically coupled to said vehicle.

52. The apparatus of claim 49 wherein said locking bracket comprises an element or combination of elements selected from a group consisting of pins, dowel pins, cylindrical rods, metallic brackets, and combinations thereof.

53. The apparatus of claim 49 further comprising a release actuator to release said locking bracket in response to a release actuator signal enabling said trunk lid to move out of said open position.

54. The apparatus of claim 53 wherein said release actuator comprises an element or combination of elements selected from a group consisting of solenoids, linear motors, rotary motors, and combinations thereof.

55. The apparatus of claim 53 further comprising an operator release device which issues an operator release signal when activated by the operator.

56. The apparatus of claim 55 wherein said operator release device comprises an element or combination of elements selected from a group consisting of push buttons, pull buttons, switches, levers, pull handles, buttons, keys, knobs and switches.

57. The apparatus of claim 55 wherein said release actuator releases said locking bracket enabling said trunk lid to move out of said open position when said operator release device is activated.

58. The apparatus of claim 55 wherein said release actuator releases said locking bracket enabling said trunk lid to move out of said open position when said operator release device is activated and there is no object an said end-effector.

59. The apparatus of claim 55 wherein said release actuator releases said locking bracket enabling said trunk lid to move out of said open position when said operator release device is activated and there is no object on said end-effector and said end-effector has reached its said upper limit position.

60. The apparatus of claim 49 wherein said locking mechanism comprises:
   a first link rotatably coupled to said vehicle and adapted for holding and releasing said locking pin;
   a second link rotatably coupled to said vehicle and adapted for sliding against said first link;
   a linkage spring adapted for developing a bias force between said first link and said second link;
   a linkage stop mechanically coupled to said vehicle and adapted for preventing rotation of said second link when said second link is in a locked position; and
   a release member adapted for applying a release torque to said second link.

61. The apparatus of claim 49 further comprising a pull handle adapted for coupling an operator release force to said locking mechanism.

62. The apparatus of claim 61 further comprising:
   a release stopper mechanically coupled to said locking mechanism; and
   an interlock solenoid adapted for preventing motion of said release stopper in response to an interlock solenoid command.

63. The apparatus of claim 1 further comprising a mounting frame mechanically coupled to said trunk lid for transmitting at least a portion of the tensile force in said line to trunk lid.

64. The apparatus of claim 63 wherein said mounting frame comprises:
   an upper mounting frame; and
   a lower mounting frame mechanically coupled to said upper mounting frame.

65. The apparatus of claim 63 wherein said mounting frame comprises at least one motion guide adapted for guiding the motion of said mounting frame with respect to said trunk lid.

66. The apparatus of claim 65 wherein said motion guide comprises a rod bearing.

67. The apparatus of claim 1 wherein said actuator comprises a line routing system adapted for routing said line.

68. The apparatus of claim 67 wherein said line routing system comprises a routing pulley.

69. A method for loading an object into a vehicle, said vehicle having a trunk lid, said method comprising the acts of:
   holding said trunk lid in an open position against said at least a portion of said tensile force when said trunk lid reaches an open position;
   applying a tensile force to a line by use of an actuator coupled to said vehicle in response to an actuator command;
   transmitting at least a portion of a tensile force to said trunk lid;
   transmitting said tensile force and an operator force to said object using an end-effector;
   generating an operator force measurement;
   generating said actuator command from said operator force measurement;

moving said end-effector as a function of said operator force measurement when said operator is imposing a downward vertical force on said end-effector; and
automatically moving said end-effector upwardly when said operator is not imposing any downward vertical force on said end-effector.

70. The method of claim 69 wherein said act of applying a tensile force to said line further comprises the acts of:
generating a motor torque in response to said actuator command;
applying said motor torque to a take-up pulley; and
applying a tensile force to said line using said take-up pulley.

71. The method of claim 69 wherein said act of applying a tensile force to said line further comprises the acts of:
generating a lower limit signal when said end-effector reaches a prescribed lower limit position; and
generating said actuator command from said lower limit signal.

72. The method of claim 69 wherein said act of applying a tensile force to said line further comprises the acts of:
generating a slack signal when said line becomes slack; and
optionally, redirecting said line.

73. The method of claim 69 wherein said act of applying a tensile force to said line further comprises generating an upper limit signal when an upper limit marker reaches a prescribed upper limit position.

74. The method of claim 69 wherein said act of generating an operator force measurement comprises sensing a deformation of a compliant element, said operator force measurement being a function of said deformation.

75. The method of claim 69 wherein said act of transmitting said tensile force and an operator force to said object further comprises generating a handle switch signal when a handle is grasped.

76. The method of claim 69 wherein said act of generating said actuator command comprises the acts of:
generating an amplifier command signal from said operator force measurement; and
generating said actuator command from said amplifier command signal.

77. The method of claim 76 wherein said act of generating said actuator command from said amplifier command signal comprises the acts of:
filtering a raw supply voltage to produce a filtered supply voltage;
generating a regulated voltage from said filtered supply voltage; and
generating said actuator command from said amplifier command signal and said filtered supply voltage.

78. An apparatus for loading an object into a vehicle, said vehicle having a trunk lid, said apparatus comprising:
an actuator coupled to said vehicle and adapted for applying a force to an end-effector in response to an actuator command, and disposed and adapted for transmitting at least a portion of said force to said trunk lid; said end-effector mechanically coupled to said actuator and adapted for transmitting said force and an operator force to said object and for generating an operator force measurement; a holding system holding said trunk lid in an open position against said at least a portion of said tensile force when said trunk lid reaches said open position; and
a controller adapted for generating said actuator command from said operator force measurement wherein said end-effector automatically moves upwardly when said operator is not imposing any downward vertical force on said end-effector and moves as a function of said operator force measurement when said operator is imposing a downward vertical force on said end-effector.

79. The apparatus of claim 78 wherein said actuator comprises:
a motor adapted for generating a motor torque in response to said actuator command; and
a take-up pulley adapted for receiving said motor torque and applying a tensile force to a line; said line rapped around said pulley and connectable to said end-effectors.

80. The apparatus of claim 78 wherein said actuator comprises a mechanism adapted for receiving said motor torque and applying a force to said end-effector.

81. A vehicle, among other components, comprising:
a trunk lid rotatably coupled to said vehicle and having an open position where inside said vehicle trunk can be accessed;
a line movably coupled to said trunk lid;
an actuator coupled to said vehicle and adapted for applying a tensile force to said line in response to an actuator command;
a holding system wherein said holding system holds said trunk lid in an open position against said at least a portion of said tensile force when said trunk lid reaches said open position;
an end-effector coupled to said line and adapted for transmitting said tensile force and an operator force to an object and for generating an operator force measurement; and
a controller adapted for generating said actuator command from said operator force measurement wherein said end-effector automatically moves upwardly when said operator is not imposing any downward vertical force on said end-effector and said end-effector moves as a function of said operator force measurement when said operator is imposing a downward vertical force on said end-effector.

82. A vehicle, among other components, comprising:
a trunk lid rotatably coupled to said vehicle and having an open position where inside said vehicle trunk can be accessed;
a line movably coupled to said trunk lid and connectable to an object through an end-effector;
an actuator coupled to said vehicle and adapted for applying a tensile force on said line;
a holding system adapted for holding said trunk lid in an open position against said at least a portion of said tensile force when said trunk lid reaches said open position;
wherein said actuator moves said line thereby lowering and lifting said object; and
wherein said end-effector automatically moves upwardly when said operator is not imposing any downward vertical force on said end-effector and said end-effector moves as a function of said operator force measurement when said operator is imposing a downward vertical force on said end-effector.

83. A vehicle, among other components, comprising:
a trunk lid coupled to said vehicle and having an open position where inside said vehicle trunk can be accessed;
an end-effector movably coupled to said trunk lid and connectable to an object wherein said end-effector includes a handle to be held by an operator and generates an operator force measurement;

an actuator coupled to said vehicle and adapted to move said end-effector;

a controller controlling the operation of said actuator; and a holding system wherein said holding system holds said trunk lid in an open position against said at least a portion of said tensile force when said trunk lid reaches said open position;

wherein when said trunk lid is held in said open position said controller controls said actuator such that said end-effector automatically moves upwardly when said operator is not imposing any downward vertical force on said end-effector and said end-effector moves as a function of said operator force measurement when said operator is imposing a downward vertical force on said end-effector.

84. An object handling device for loading an object into the trunk of a vehicle, comprising:

a line movably coupled to said vehicle trunk lid and connectable to an object through an end-effector;

an actuator configurable to be coupled to said vehicle and adapted for applying a tensile force on said line; and a holding system wherein said holding system holds said trunk lid in an open position against said at least a portion of said tensile force when said trunk lid reaches said open position;

wherein said actuator moves said line thereby lowering and lifting said object such that said end-effector automatically moves upwardly when said operator is not imposing any downward vertical three on said end-effector and said end-effector moves as a function of said operator force measurement when said operator is imposing a downward vertical force on said end-effector.

85. An object handling device for loading an object into the trunk of a vehicle, comprising:

an end-effector movably coupled to said vehicle trunk lid and connectable to an object wherein said end-effector includes a handle to be held by an operator and generates an operator force measurement;

an actuator configurable to be coupled to said vehicle and adapted to move said end-effector;

a controller controlling the operation of said actuator; and a holding system wherein said holding system holds said trunk lid in an open position against said at least a portion of said tensile force when said trunk lid reaches said open position;

wherein when said trunk lid is held in an open position said controller controls said actuator to lift and lower said object as a function of said operator force measurement such that said end-effector automatically moves upwardly when said operator is not imposing any downward vertical force on said end-effector and said end-effector moves as a function of said operator force measurement when said operator is imposing a downward vertical force on said end-effector.

86. The apparatus of claim 1 further comprising a release actuator enabling said trunk lid to move out of said open position.

87. The vehicle of claim 82 further comprising a release actuator enabling said trunk lid to move out of said open position.

88. The vehicle of claim 83 further comprising a release actuator enabling said trunk lid to move out of said open position.

89. The object handling device of claim 84 further comprising a release actuator enabling said trunk lid to move out of said open position.

90. The object handling device of claim 85 further comprising a release actuator enabling said trunk lid to move out of said open position.

* * * * *